(12) United States Patent
Nakata

(10) Patent No.: US 11,804,879 B2
(45) Date of Patent: Oct. 31, 2023

(54) TERMINAL APPARATUS AND COMMUNICATION METHOD FOR TERMINAL APPARATUS

(71) Applicant: DENSO CORPORATION, Kariya (JP)

(72) Inventor: Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/591,695

(22) Filed: Feb. 3, 2022

(65) Prior Publication Data
US 2022/0158693 A1 May 19, 2022

Related U.S. Application Data

(63) Continuation of application No. PCT/JP2020/029633, filed on Aug. 3, 2020.

(30) Foreign Application Priority Data

Aug. 5, 2019 (JP) .................................. 2019-144046

(51) Int. Cl.
*H04B 7/04* (2017.01)
*H04B 7/0404* (2017.01)
*H04B 7/0456* (2017.01)

(52) U.S. Cl.
CPC ......... *H04B 7/0404* (2013.01); *H04B 7/0469* (2013.01); *H04B 7/0473* (2013.01)

(58) Field of Classification Search
CPC .. H04B 7/0404; H04B 7/0469; H04B 7/0473; H04B 7/0874; H04B 7/0691; H04B 7/0602; H04B 7/0802; H04W 4/44; H04W 88/02
See application file for complete search history.

(56) References Cited

U.S. PATENT DOCUMENTS

| 2005/0239507 | A1 | 10/2005 | Doi |
| 2008/0039015 | A1 | 2/2008 | Nakata et al. |
| 2009/0122843 | A1* | 5/2009 | Mitsuhashi .......... H04B 7/0817 375/295 |

(Continued)

FOREIGN PATENT DOCUMENTS

| JP | H03115439 U | 11/1991 |
| JP | H04137829 A | 5/1992 |

(Continued)

*Primary Examiner* — Siu M Lee

(74) *Attorney, Agent, or Firm* — Harness, Dickey & Pierce, P.L.C.

(57) ABSTRACT

A terminal apparatus mounted on a movable body is provided to communicate with an external communication apparatus outside the movable body. The terminal apparatus includes an antenna, and a communicator device. The antenna includes a plurality of antenna elements to be arranged along a traveling direction of the movable body. The communicator device is configured to communicate with the external communication apparatus using a communicating antenna element that is at least one of the plurality of antenna elements. The communicating antenna element is selected from the plurality of antenna elements so as to belong to a specified region. The specified region is defined by propagation environment information of an electric wave propagation path of a signal transmitted to and received from the external communication apparatus.

17 Claims, 19 Drawing Sheets

(56) References Cited

U.S. PATENT DOCUMENTS

| | | |
|---|---|---|
| 2010/0009636 A1 | 1/2010 | Hasegawa |
| 2013/0095882 A1 | 4/2013 | Saito |
| 2014/0046581 A1 | 2/2014 | Ota et al. |
| 2015/0124895 A1 | 5/2015 | Park et al. |
| 2015/0171940 A1 | 6/2015 | Park et al. |
| 2015/0334535 A1 | 11/2015 | Nakata et al. |
| 2016/0173174 A1 | 6/2016 | Park et al. |
| 2016/0174241 A1* | 6/2016 | Ansari ............... H01Q 1/32 370/329 |
| 2016/0249233 A1* | 8/2016 | Murray ............... H04L 67/12 |
| 2017/0223733 A1 | 8/2017 | Nakata |
| 2018/0048363 A1* | 2/2018 | Okuyama ............ H04B 7/0456 |
| 2018/0367209 A1* | 12/2018 | Jamaly .............. H04B 7/1555 |
| 2019/0053011 A1* | 2/2019 | Nakata ............... H04L 25/0204 |
| 2019/0181105 A1* | 6/2019 | Chen ................. H01L 23/66 |

FOREIGN PATENT DOCUMENTS

| | | |
|---|---|---|
| JP | 2003-283466 A | 10/2003 |
| JP | 2006217228 | 8/2006 |
| JP | 2007295408 | 11/2007 |
| JP | 2008-011039 A | 1/2008 |
| JP | 2009017469 A | 1/2009 |
| JP | 2010-021647 A | 1/2010 |
| JP | 2010283462 A | 12/2010 |
| JP | 2013-090065 A | 5/2013 |
| JP | 2015-527772 A | 9/2015 |
| JP | 2017038192 A | 2/2017 |
| JP | 2017139727 A | 8/2017 |
| JP | 2017-184031 A | 10/2017 |
| JP | 6330471 B2 | 5/2018 |
| JP | 6503994 B2 | 4/2019 |
| WO | WO-2005081558 A1 | 9/2005 |
| WO | WO-2012144255 A1 | 10/2012 |
| WO | WO-2017135368 A1 | 8/2017 |

* cited by examiner (A) TIME t1

(B) TIME t2

(C) TIME t3

(D) TIME t4

(A)

(B)

(C)

(D)

(A) TIME t1

(B) TIME t2

(C) TIME t3

(D) TIME t4

COMMUNICATION SYSTEM 1003

TERMINAL APPARATUS AND COMMUNICATION METHOD FOR TERMINAL APPARATUS

CROSS-REFERENCE TO RELATED APPLICATIONS

The present application is a continuation application of International Patent Application No. PCT/JP2020/029633 filed on Aug. 3, 2020, which designated the U.S. and claims the benefit of priority from Japanese Patent Application No. 2019-144046 filed on Aug. 5, 2019. The entire disclosures of all of the above applications are incorporated herein by reference.

TECHNICAL FIELD

This application relates to a terminal apparatus and a communication method for the terminal apparatus.

BACKGROUND

There is a technique where communication is performed between a terminal apparatus mounted on a vehicle and a base station. Such a technique has realized services such as providing information, which is acquired by a sensor mounted on the vehicle, from the vehicle to the base station and providing information necessary for traveling of the vehicle from the base station to the vehicle. Furthermore, there are actively conducted researches or demonstration experiments of vehicle-to-vehicle communication for exchanging information between one vehicle and another vehicle.

Further, there is disclosed a wireless communication system that realizes a large transmission capacity while obtaining a directional gain in communication between a base station apparatus and the terminal apparatus, even when the terminal apparatus moves at high speed. Specifically, a transmission weight vector is calculated in advance based on a plurality of channel information between the base station antenna element and the antenna of the terminal apparatus acquired in advance for each position on the path on which the vehicle moves. This calculated transmission weight vector is stored. The data signal transmitted by the base station to the terminal apparatus is multiplied by the transmission weight vector corresponding to the position of the terminal apparatus.

SUMMARY

According to an example of the present disclosure, a terminal apparatus mounted on a movable body is provided to communicate with an external communication apparatus outside the movable body. The terminal apparatus includes an antenna, and a communicator device. The antenna includes a plurality of antenna elements to be arranged along a traveling direction of the movable body. The communicator device is configured to communicate with the external communication apparatus using a communicating antenna element that is at least one of the plurality of antenna elements. The communicating antenna element is selected from the plurality of antenna elements so as to belong to a specified region. The specified region is defined by propagation environment information of an electric wave propagation path of a signal transmitted to and received from the external communication apparatus.

BRIEF DESCRIPTION OF THE DRAWINGS

The objects, features, and advantages of the present disclosure will become more apparent from the following detailed description made with reference to the accompanying drawings. In the drawings.

DETAILED DESCRIPTION

Hereinafter, embodiments of the present disclosure will be described with reference to the drawings.

In the present disclosure, the configuration disclosed in each embodiment is not limited to each embodiment alone, but may be combined across the embodiments. For example, a configuration disclosed in one embodiment may be combined with other embodiments. Further, the disclosed configurations may be collected and combined in each of multiple embodiments.

The issues or knowledge described in the present disclosure is not publicly known, but is found out by the person including the inventor independently. The issues or knowledge is a fact that affirms the inventive step of the present disclosure together with the configuration and method of the present disclosure.

Each of the following embodiments will be described as an example of the case where the present disclosure is used for a vehicle, but the present disclosure also includes a case where the present disclosure is used for a movable body other than the vehicle, unless there is a limitation.

1. FIRST EMBODIMENT 1.1. Overview of Communication System

First, the outline of a communication system of the present embodiment will be described with reference to FIG. 1.

Figure 1:
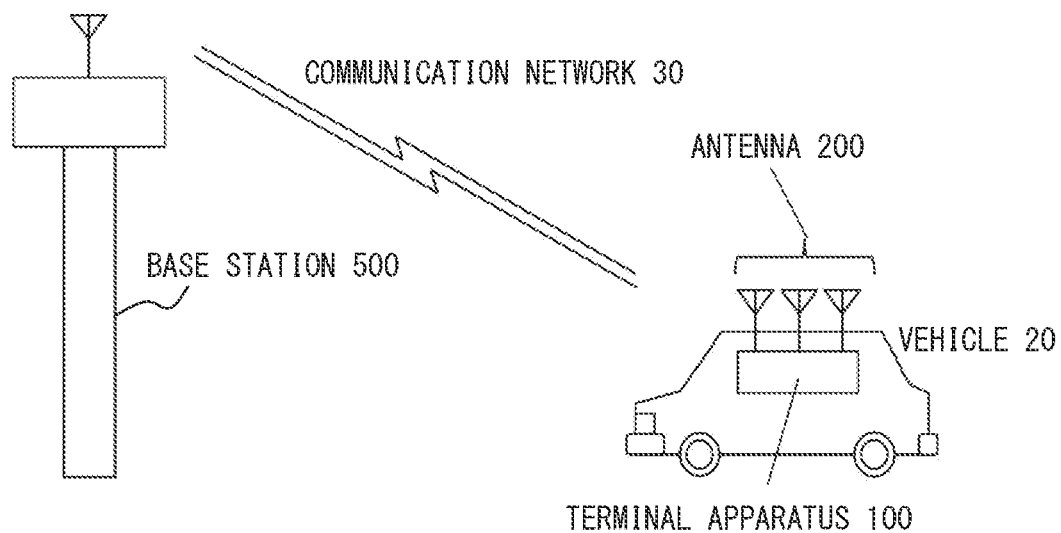
FIG. 1 is a diagram illustrating an outline of a communication system including a terminal apparatus according to a first embodiment.

The communication system 1001 shown in FIG. 1 includes a base station 500 and a terminal apparatus 100 mounted on a vehicle 20. The terminal apparatus 100 includes an antenna 200 composed of a plurality of antenna elements.

The base station 500 is, for example, a wireless station fixed on land and communicates with the terminal apparatus 100 mounted on the vehicle 20. Further, the base station 500 communicates with a server (not shown). For example, when the terminal apparatus 100 downloads data from the server, the base station 500 relays the data to the terminal apparatus 100. Further, when the terminal apparatus 100 uploads the data obtained by the sensor in the vehicle 20 to the server, the base station 500 relays the data to the server.

The base station 500, which is only required to be enabled to relay communication between the vehicle 20 and the server, may have any name such as a wireless base station, a roadside unit, or a communication apparatus. In other words, when a wide area wireless communication system is used, the base station 500 is a wireless base station installed on the roof of a building or a steel tower. When a road-to-vehicle communication is used, the base station 500 is a roadside unit installed on traffic lights, signs, etc. When vehicle-to-vehicle communication is used, the base station 500 is a communication apparatus installed in another vehicle.

The terminal apparatus 100 is mounted on the vehicle 20 (corresponding to a movable body). The terminal apparatus 100 communicates with the base station 500 (corresponding to an external communication apparatus) outside the vehicle 20 via the communication network 30, to transmit and receive necessary information. The vehicle 20 may be a driver-driven vehicle operated by the driver or an automatically driven vehicle operated by the system according to each level.

Here, "mounted" includes a case where the terminal apparatus is fixed to the movable body or a component of the movable body, and a case where the terminal apparatus follows the movement of the movable body while being separated from the movable body.

The terminal apparatus 100 may be required to transmit and receive necessary information, execute calculations, control based on the input commands, and output the result. Thus, the terminal apparatus 100 may also be named as any other name such as an information processing apparatus, information processing module, microcomputer, or the like. Further, the terminal apparatus 100 may be an apparatus that executes driving support of the vehicle 20 based on data acquired by various sensors. Thus, the terminal apparatus 100 may also be referred to as an electronic control unit (ECU), a driving support apparatus, or an automated driving apparatus, or the like.

A wireless communication method is used for the communication network 30 for communication between the base station 500 and the terminal apparatus 100. A wireless communication is employed, such as IEEE802.11 (Wi-Fi: registered trademark), IEEE802.16 (WiMAX: registered trademark), W-CDMA (Wideband Code Division Multiple Access), HSPA (High Speed Packet Access), LTE (Long Term Evolution), LTE-A (Long Term Evolution Advanced), 4G, and 5G.

1.2. Configuration of Terminal Apparatus 100

Next, the configuration of the terminal apparatus 100 of the present embodiment will be described with reference to FIG. 2.

The terminal apparatus 100 includes an antenna 200, a storage device 102, a CPU (Central Processing Unit) 103, a communicator device 106, and a switch 107. Hereinafter, a storage device 102 may also be referred to as a storage 102; a communicator device 106 may also be referred to as a communicator 106 or a transceiver 106. The CPU 103 is connected to the GPS 101, the storage device 102, and the communicator device 106, controls them, and performs various calculations. In particular, in the present embodiment, the CPU 103 realizes a region specification unit 104 and an antenna element selection unit 105. Although the GPS 101 is provided outside the terminal apparatus 100 in the present embodiment, it may be built in the terminal apparatus 100.

The GPS 101 acquires geographic coordinates, which are the position information of the current position of the vehicle 20. The GPS 101 may be a differential GPS or an inertial navigation system (INS) other than the normal GPS.

The antenna 200 is connected to the communicator device 106 via the switch 107, and transmits and receives electric waves to and from the base station 500. The antenna 200 is composed of a plurality of antenna elements having the same performance and function; the directivity and gain of each antenna element are the same. Each antenna element may be capable of transmitting and receiving electric waves used in the above-mentioned wireless communication method, and may have any shape and size such as linear, plate, and planar. Further, each antenna element is preferably omnidirectional in order to enable communication in a movable body whose moving direction is not constant, but it may be directional.

Figure 3:
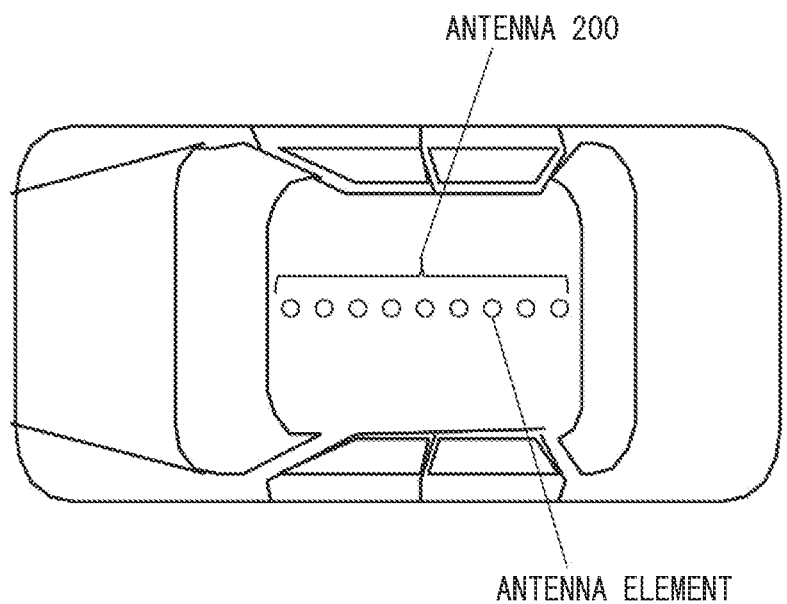
FIG. 3 is a diagram illustrating an antenna included in the terminal apparatus according to the first embodiment.

FIG. 3 is a diagram showing an antenna 200 mounted on the vehicle 20. As shown in FIG. 3, in the antenna 200, a plurality of antenna elements are arranged on the upper surface of the vehicle 20 from the front to the rear of the vehicle 20, that is, along the traveling direction of the vehicle 20.

It is desirable that the total length of the region where the antenna 200 is arranged is longer than the wavelength of the electric wave used for communication. If it is shorter than the wavelength of the electric wave, the reception intensity of the electric wave may be weakened in any region where the antenna 200 is arranged due to the influence of fading; thereby, the region having a strong reception intensity may not be included. As described above, the wireless communication method includes WiFi, WiMAX, W-CDMA, HSPA, LTE, LTE-A, 4G, or 5G. The electric wave wavelength thereof is within the range of 10 cm to 1 m. Therefore, it is desirable that the region where the antenna 200 is arranged covers these range.

It is desirable that the number of antenna elements included in the antenna 200 is adjusted so that a plurality of antenna elements are included in one wavelength of the electric wave used for communication. For example, it is desirable that the antenna elements are arranged at intervals of ¼ wavelength or less.

The storage device 102 stores propagation environment information of the electric wave propagation path of the signal transmitted to and received from the base station 500. In the present embodiment, the estimation result of the signal intensity attenuation factor, which is one of the evaluation indexes of the propagation environment, is used as the propagation environment information. The signal intensity attenuation factor corresponds to the reception intensity of the reference signal transmitted at a predetermined intensity and frequency. Therefore, in the following, the signal intensity attenuation factor is simply referred to as the reception intensity. The following examples can be given as a method for the generator of the propagation environment information and the terminal apparatus 100 to acquire the propagation environment information.

(1) When Generated by Different Terminal Apparatus

A different terminal apparatus mounted on a different vehicle receives a measurement result of a reference signal from the base station 500, and estimate the state of the propagation path based on the received measurement result. As a result, the propagation environment information is generated in the different terminal apparatus. In this case, the terminal apparatus 100 acquires the propagation environment information by receiving the propagation environment information directly from the different terminal apparatus using the vehicle-to-vehicle communication, or by downloading (i.e., receiving), from the server, the propagation environment information which is once transmitted from the different terminal apparatus to the server via the base station 500. In this case, the generated propagation environment information is used to select the antenna element for reception. In the present embodiment, the case of (1) will be described as a premise.

(2) When Generated by the Terminal Apparatus 100 Itself

The terminal apparatus 100 estimates the state of the propagation path based on the measurement result of the reference signal received from the base station 500. As a result, the propagation environment information is generated in the terminal apparatus 100. In this case, the terminal apparatus 100 generates and acquires propagation environment information from the measurement result of the reference signal received by the reference antenna element mounted on the terminal apparatus 100, which will be described later. In this case, the generated propagation environment information is used to select the antenna element for reception, as in (1). The case of (2) will be described in a second embodiment.

(3) When Generated by Base Station 500

The state of the propagation path is estimated based on the measurement result of the reference signal transmitted by the terminal apparatus 100 to the base station 500. As a result, the base station 500 generates the propagation environment information. In this case, the terminal apparatus 100 receives the propagation environment information directly from the base station 500. Alternatively, it is acquired by downloading, that is, receiving what was once transmitted from the base station 500 to the server. In this case, the generated propagation environment information is used to select the antenna element for transmission.

Here, the propagation environment information indicates the estimation result of the state of the propagation path; an index showing the state of the propagation path includes the reception intensity, SNR, SIR, BER, the propagation function, and the propagation path matrix.

In the present embodiment, as the propagation environment information, the estimated value of the reception intensity is not singly used. That is, in addition to the estimated value of the reception intensity, an electric wave map is used. The electric wave map indicates, for each frequency of the reference signal, the correlation between the position information of the receiving apparatus and the estimated value of the reception intensity at the position indicated by the position information. In the present embodiment, the electric wave map is prepared as the correlation between (i) the position information acquired in advance while a different vehicle is traveling and (ii) the reception intensity estimated based on the measurement result of the reference signal received by the different vehicle at the position indicated by the position information. This electric wave map is acquired by receiving directly from the different vehicle or by receiving from a server (not shown). Instead, the electric wave map may be generated from (i) the position information acquired while the host vehicle is traveling and (ii) the reception intensity estimated based on the measurement result of the reference signal received by the host vehicle at the position indicated by the position information. This will be described in the second embodiment described later.

The storage device 102 may be composed of a non-volatile storage device (not shown) such as an HDD or a flash memory, or may be composed of a volatile storage device such as a RAM.

Figure 4:
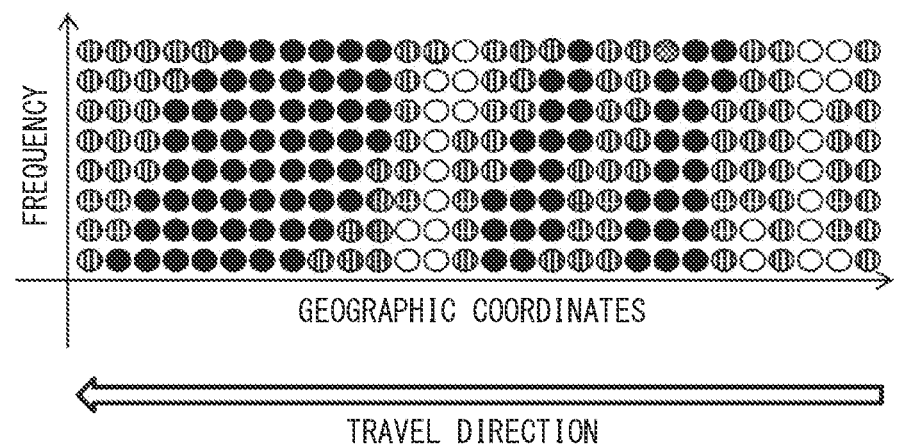
FIG. 4 is a diagram illustrating propagation environment information used in the terminal apparatus according to the first embodiment.
Figure 4:
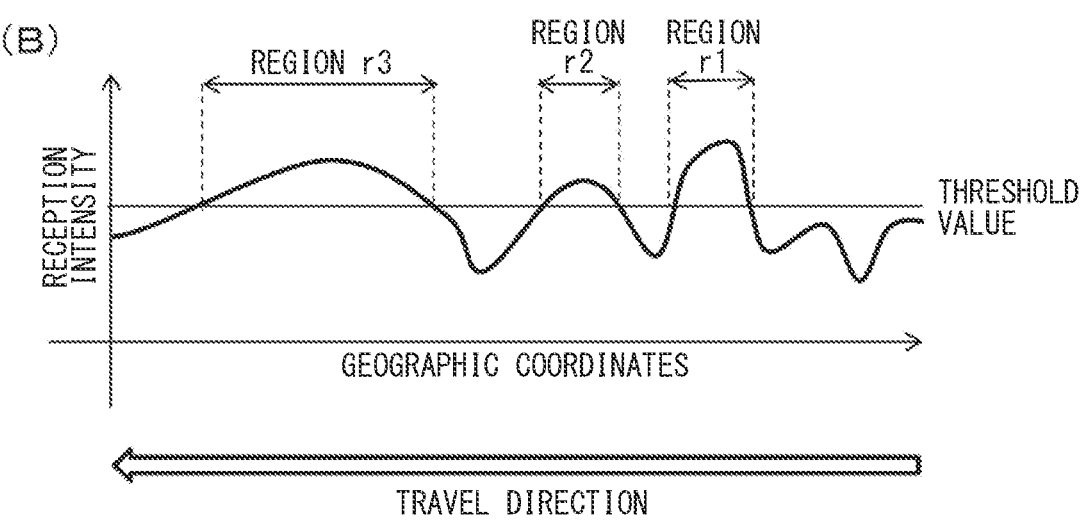

In FIG. 4, (A) and (B) show an example of a electric wave map including propagation environment information. In FIG. 4, (A) is a plot of the reception intensity estimated based on the measurement result of the reference signal at each geographic coordinates along the traveling direction of the vehicle for each frequency. Since the geographic coordinates are the position information acquired by the GPS 101, they represent the stationary coordinates. When the traveling direction of the vehicle 20 is set to the left in the drawing, the geographic coordinates indicate the position passed in the past as it goes to the right. The circles in the drawing indicate the reception intensity estimated based on the measurement result of the reference signal. The black circles are the positions and frequencies where the reception intensity is strong. The white circles are the positions and frequencies where the reception intensity is weak. The gray circles are the positions and frequencies where the reception intensity is in between weak and strong. In the drawing, the reception intensity is shown in three stages, but a continuous value or a quantization value of more than three stages may be used.

In FIG. 4, (B) is a graph showing a numerical value obtained by integrating the reception intensity estimated based on the measurement result of the reference signal of (A) in FIG. 4 by frequency. That is, it corresponds to the sum or average of the reception intensities in the entire frequency domain for each geographic coordinates. The present embodiment will describe the case where the electric wave map of (B) in FIG. 4 is used. In addition, the electric wave map may use the reception intensity estimated based on the measurement result of the reference signal in a specific frequency region.

The region specification unit 104 acquires the propagation environment information, that is, the reception intensity estimated based on the measurement result of the reference signal from the storage device 102, and specifies a region defined by the reception intensity and used for communication with the antenna 200. In the present embodiment, the reception intensity obtained from the storage device 102 is used to specify a region where the reception intensity is equal to or higher than a predetermined threshold value. For example, in (B) in FIG. 4, of a solid line showing reception intensity, regions that are equal to or greater than a predetermined threshold value are designated as regions r3, region r2, and region r1, respectively. By specifying in this way, stable communication can be performed in a region where the communication environment is good. When a predetermined threshold value is set to a value that specifies only one region, it is synonymous with specifying the region having the maximum reception intensity. Therefore, selecting the region having the maximum reception intensity is also included in the present embodiment.

Here, "acquisition" includes not only the case where the propagation environment information is acquired from an external communication apparatus or the like, but also the case where the propagation environment information is acquired by the terminal apparatus itself. Further, "definition" means being expressed by the value of the propagation environment information, the position or shape of the propagation environment information, and the like. In addition to the case where the propagation environment information is directly defined, the case where the propagation environment information is indirectly defined by being modified, processed, or calculated is also included. The predetermined threshold value may be a constant value or a variable value obtained by a predetermined calculation. Further, a region is specified where the reception intensity is equal to or higher than a predetermined threshold value. Instead, a region may be specified where the reception intensity is higher than a predetermined threshold value, excluding a region where the reception intensity is equal to the predetermined threshold value.

There may be an example of not using a threshold value to specify a region. Suppose a case where the reception intensity estimated based on the measurement result of the reference signal is substantially flat. Such a case may specify a predetermined region that is positioned at the front in the traveling direction of the vehicle 20 and is ready for reception of the antenna element. By specifying in this way, when the vehicle 20 is traveling, communication can be continued for a longer time. Further, the region may be specified by the position of the mountain of the reception intensity. For example, when there are a plurality of mountains, the region where the front mountain in the traveling direction of the vehicle 20 is located may be specified. By specifying in this way, when the vehicle 20 is traveling, communication can be continued for a longer time. Further, the region may be specified by the shape of a mountain of reception intensity. For example, in the case of a mountain having a steep shape and a mountain having a gentle shape, the region where the latter mountain is located may be specified. As a method for specifying the shape, for example, a shape evaluation function can be used. By specifying in this way, the antenna element can easily follow the region when the vehicle 20 is traveling. In addition, as the shape of the mountain, a region including the mountain having the maximum reception intensity may be specified. As a method of specifying the mountain with the maximum reception intensity, comparison of peak values or comparison of integrated values of reception intensity in a unit region can be mentioned.

The antenna element selection unit 105 selects an antenna element to be used for communication in the communicator device 106. Specifically, at least one antenna element belonging to the region specified by the region specification unit 104 is selected. Then, the antenna element selection unit 105 instructs the switch 107 to select the selected antenna element. The switch 107 is connected to the antenna 200 and the communicator device 106, and switches the antenna elements so as to connect the antenna element selected by the antenna element selection unit 105 with the communicator device 106. Note that a plurality of antenna elements may be respectively connected to the corresponding communicator devices 106. In such a case, in the communicator device 106 corresponding to the selected antenna element, the weight may be set to be one (1), that is, the signal transmission/reception amplitude may be set to maximum to select the corresponding antenna element. In contrast, in the communicator device 106 corresponding to the antenna element that is not selected, the weight may be set to zero (0), that is, the transmission/reception amplitude of the signal may be set to zero not to select the corresponding antenna element. Because they are generally complex numbers that include phase information, weights are also called complex weights. When the weight is represented by a real number as in the above example, it means that the phase is not adjusted in the communicator device.

In the present embodiment, the antenna element selection unit 105 first specifies the position of the vehicle 20 on the electric wave map based on the position information of the vehicle 20 acquired by the GPS 101. At the same time, the position of each antenna element on the electric wave map is specified. Since the position of the antenna element is known in the terminal apparatus 100, the position of each antenna element can also be obtained based on the position information acquired by the GPS 101. Then, the antenna element selection unit 105 selects an antenna element belonging to the region specified by the region specification unit 104. In the present embodiment, the antenna elements belonging to the region r3, the region r2, and the region r1 in (B) in FIG. 4 are selected. When there are a plurality of candidate antenna elements, any one antenna element can be selected in the case of SISO (Single Input Single Output). More preferably, the region with the highest reception intensity is selected. As a result, stable communication can be performed because the antenna element located at the best position in the communication environment is used. In a propagation path having frequency selectivity, this region differs depending on the frequency. In that case, the antenna element having the optimum index considering the average efficiency at all frequencies, the maximum efficiency, or the frequency selectivity such as the frequency resource required to obtain the required communication capacity is selected.

Alternatively, more preferably, the antenna element on the front in the traveling direction is selected from the antenna elements belonging to the region r3 on the front in the traveling direction. As a result, once the antenna element is selected, communication can be continued by switching to the adjacent antenna element as the vehicle 20 moves. In addition, since the same region, that is, the same stationary coordinate position is followed, the propagation path state can be regarded as constant until the present region is switched to the next region. It is thus possible to reduce the repetitions of information transfer between the transmission/reception nodes required for the propagation path estimation process and the process.

The case where two or more antenna elements are selected will be described in a third and fourth embodiments.

The antenna element selection unit 105 periodically selects an antenna element by using the position information acquired by the GPS 101 as the vehicle 20 moves. By performing such processing on a regular basis, it is possible to switch to an appropriate antenna element as the vehicle 20 moves. When switching the antenna element, instead of using the position information, the antenna element selection unit 105 may obtain the position occupied by the region specified by the region specification unit 104 in the vehicle 20 based on the speed information of the vehicle 20. By using the speed information, it is not necessary to use the position information that takes a long time to acquire, so that the antenna element can be smoothly switched even when the speed of the vehicle 20 is high.

Here, the speed information may directly or indirectly indicate the speed of the movable body. For example, acceleration, a moving distance per fixed time, and a required time per fixed distance, may be included in the speed information in addition to the speed. It also includes the output of a speed pulse that generates a signal such as a pulse each time the vehicle travels a certain distance.

Since switching the antenna element means switching to the selected antenna element, switching the antenna element is a concept included in the selection of the antenna element.

Figure 5:
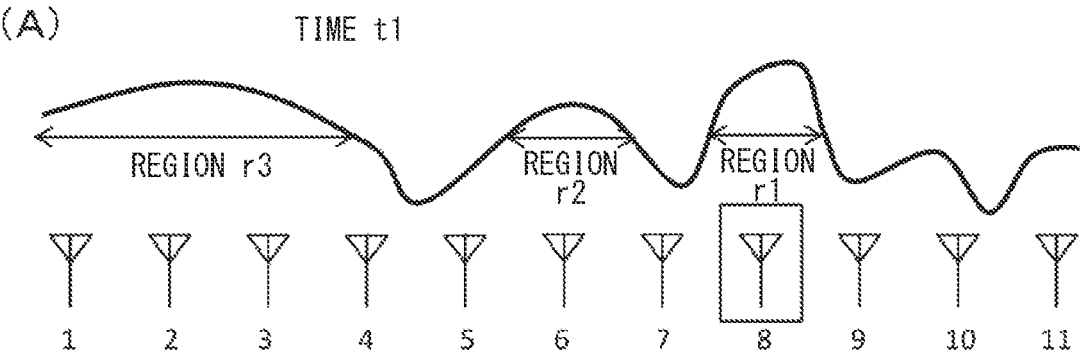
FIG. 5 is a diagram illustrating a region specified by a region specification unit and an antenna element selected by an antenna element selection unit of the terminal apparatus according to the first embodiment.
Figure 5:
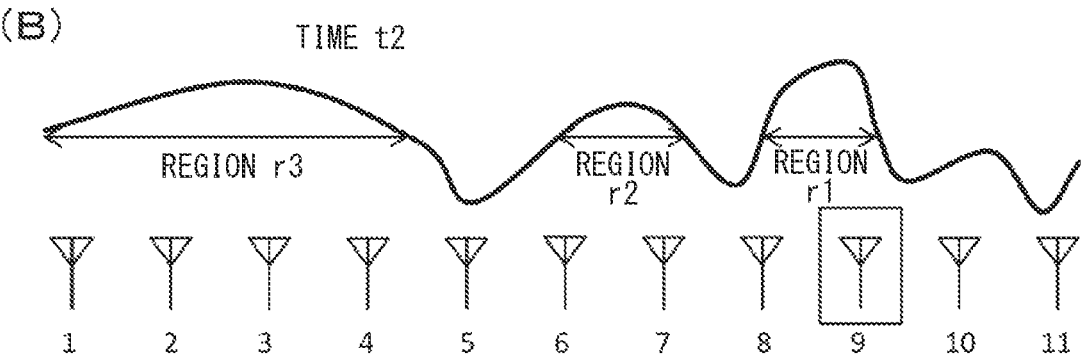
Figure 5:
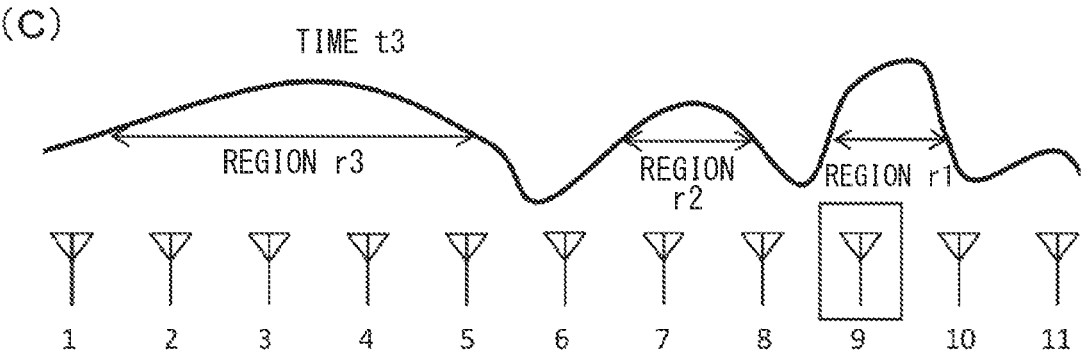
Figure 5:
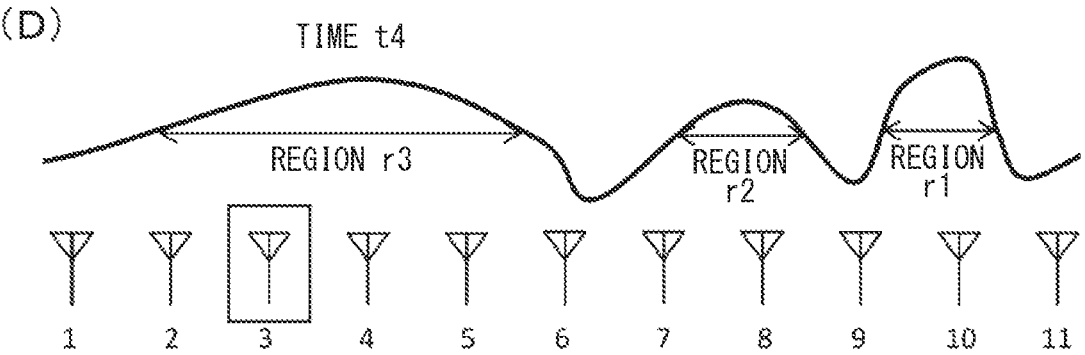

The state of selection or switching of the antenna element by the antenna element selection unit 105 will be described with reference to (A) to (D) in FIG. 5. In FIG. 5, (A) to (D) show electric wave maps at times t1 to t4, respectively. Further, the times t1, t2, t3, and t4 elapse in this order. Further, the region r3 is at the front in the traveling direction of the vehicle 20. When the vehicle 20 is moving, each region shifts to the rear, that is, to the right side of the drawing with respect to the traveling direction of the vehicle 20 with the passage of time.

As shown in (A) in FIG. 5, at time t1, the antenna element selection unit 105 selects the antenna element 8 belonging to the region r1. The region r1 is at the rearmost in the traveling direction. It is assumed that the region r1 was first selected when it was at the front in the traveling direction and has transitioned to the position shown in (A) in FIG. 5 at this time.

As shown in (B), in FIG. 5, since the region r1 has transitioned to the rear side in the traveling direction at time t2, the antenna element selection unit 105 selects the antenna element 9 belonging to the region r1. That is, the antenna element 8 is switched to the adjacent antenna element 9. Switching to an adjacent antenna element is sometimes called a handover.

As shown in (C) in FIG. 5, at time t3, the region r1 transitions to the rear side in the traveling direction. However, since the antenna element 9 still belongs to the region r1, the antenna element 9 is still selected. That is, the switching of the antenna element has not occurred.

As shown in (D) in FIG. 5, at time t4, the region r1 further transitions to the rear side in the traveling direction. In this case, the antenna element 10 may be selected. However, the time when the region r1 transitions to the rear of the vehicle 20 is approaching; thus, the antenna element 3 belonging to the region r3 on the front side in the traveling direction is selected. That is, the antenna element 9 is switched to the antenna element 3. In particular, among the antenna elements, the antenna element 1 and the antenna element 11, which are the antenna elements at both ends, have the adjacent antenna element only on one side. Therefore, the interaction from other antenna elements is different from that of the intermediate antenna element. That is, the antenna characteristics are different from those of other antenna elements. From the above, it is desirable that the antenna element selection unit 105 does not select the antenna element at the front in the traveling direction of the vehicle 20 and the antenna element at the rearmost in the traveling direction of the vehicle 20 among the plurality of antenna elements.

In FIG. 5, the antenna element selection unit 105 hands over the antenna elements so as to follow the region specified by the region specification unit 104. In contrast, when viewed from the stationary coordinate system, it can be said that as the vehicle 20 travels, the antenna elements are sequentially switched to the antenna elements located at specific stationary coordinates. That is, in order to select the antenna element communicating to be stationary on the stationary coordinates, the antenna element selection unit 105 switches in order from the antenna element on the front side in the traveling direction of the vehicle 20 toward the antenna element on the rear side in the traveling direction, as the vehicle 20 moves. As a result, the region where the communication environment is good can be used for a longer time, so that stable communication can be continued.

Here, being stationary means that the antenna element communicating is within a certain range of the stationary coordinates when viewed from the stationary coordinates.

The communicator device 106 communicates with the base station 500 via the communication network 30 by using the antenna element selected by the antenna element selection unit 105.

1.3. Operation of Terminal Apparatus 100

Next, the operation of the terminal apparatus 100 of the present embodiment will be described with reference to FIG. 6.

Figure 6:
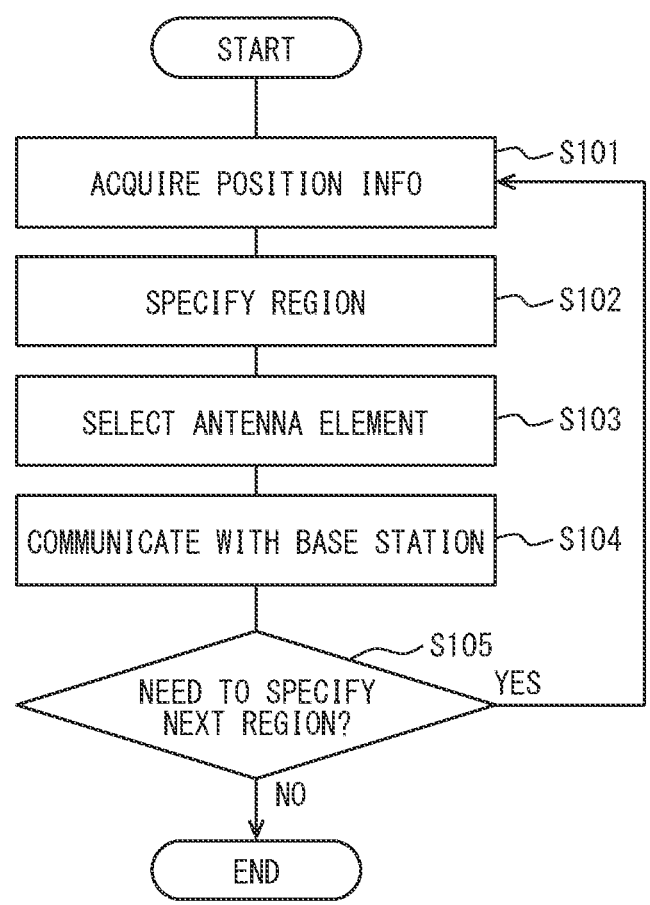
FIG. 6 is a flowchart illustrating an operation of the terminal apparatus according to the first embodiment.

The flowchart of FIG. 6 not only shows a communication method using the terminal apparatus 100, but also shows a processing procedure of a program executed by the terminal apparatus 100. Further, the order of each step may be changed unless the relationship is such that the result of another step is used in one step. The same applies to the flowcharts of the embodiments below.

In step S101, the GPS 101 acquires the position information of the vehicle 20. In step S102, the region specification unit 104 acquires the electric wave map held in the storage device 102, and specifies a region defined by the reception intensity estimated based on the measurement result of the reference signal and used for communication by the antenna 200. Specifically, in the present embodiment, a region in which the reception intensity is equal to or higher than a predetermined threshold value is specified. In step S103, the antenna element selection unit 105 selects at least one antenna element belonging to the region specified by the region specification unit 104 from the plurality of antenna elements of the antenna 200. In step S104, the communicator device 106 communicates with the base station 500 using the selected antenna element. When it is necessary to specify the next region in step S105, the process returns to step S101 to continue the process. On the other hand, if it is not necessary to specify the next region, the process ends.

1.4. Brief

As described above, according to the first embodiment, the influence of spatial selectivity fading can be reduced by selecting an appropriate antenna or antenna element and using it for communication. Moreover, since the electric wave map is acquired from the outside, it is not necessary to generate the electric wave map by itself. This is particularly effective when there is little change in the propagation environment information included in the electric wave map over time, that is, in a place where there is little change in the propagation environment of the electric wave propagation path.

1.5. First Modification Example of First Embodiment

In this modification example, the arrangement of a plurality of antenna elements constituting the antenna is changed.

1.5.1. Configuration of Terminal Apparatus 100

The terminal apparatus 100 of this modification example includes an antenna 210 in which a plurality of antenna elements are arranged in a honeycomb shape. Except for this point, the configuration of the terminal apparatus 100 is the same as that of FIG. 2. Hereinafter, only the configuration of the antenna 210 will be described.

Figure 7:
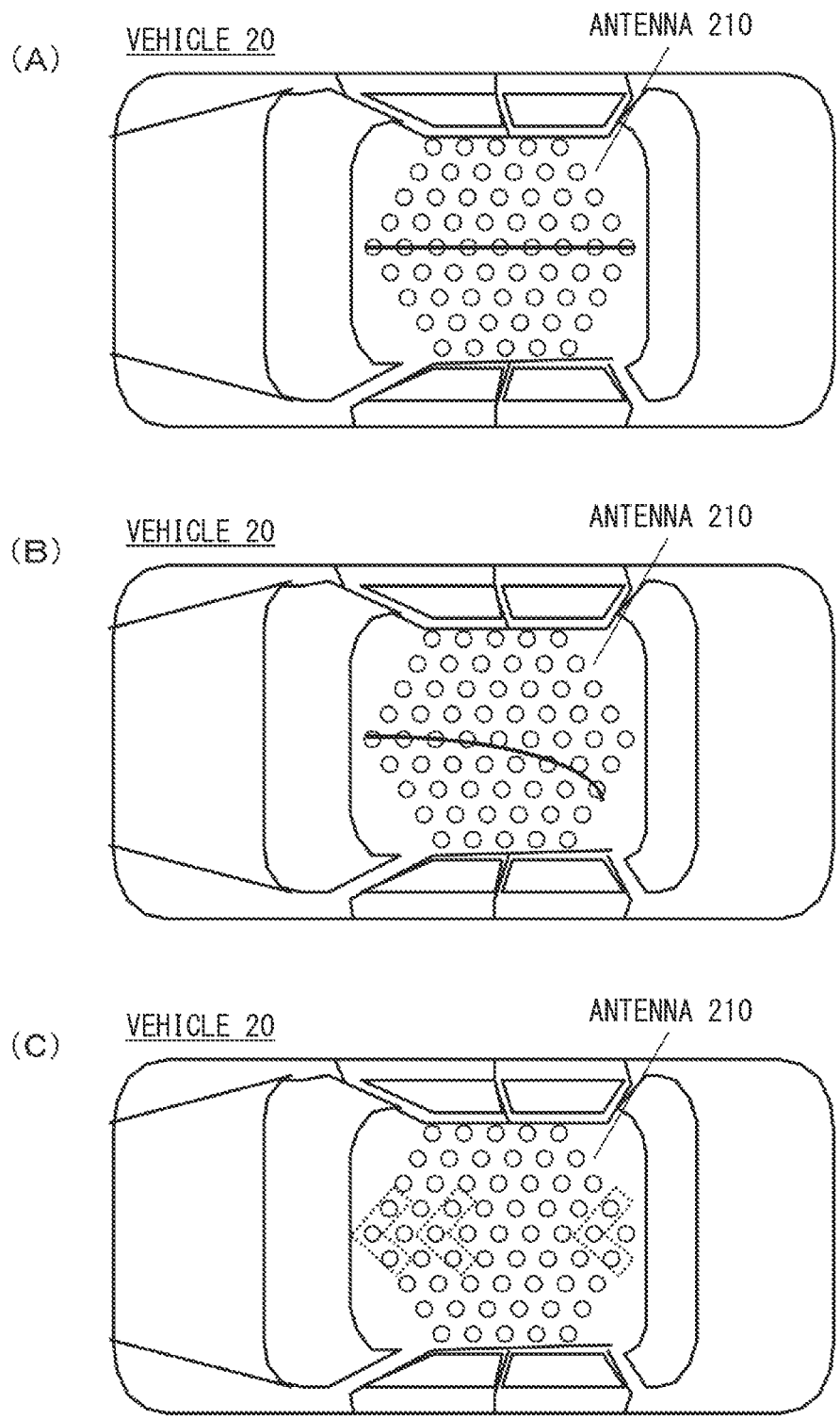
FIG. 7 is a diagram illustrating an antenna included in the terminal apparatus according to a first modification example of the first embodiment.

FIG. 7 is a diagram showing an antenna 210 mounted on the vehicle 20. As shown in (A) in FIG. 7, a plurality of antenna elements constituting the antenna 210 form a honeycomb shape on the upper surface of the vehicle 20 from the front to the rear of the vehicle 20 to be arranged such that one side in the honeycomb shape is along the traveling direction when the vehicle 20 travels straight. By adopting such an arrangement, the antenna element selection unit 105 can select the optimum antenna element even when the vehicle 20 turns to change the course. For example, as shown in (B) in FIG. 7, by using the antenna elements along the turning direction, the deviation from the geographic coordinates of the electric wave map can be minimized.

The antenna element selection unit 105 may select an antenna element group in which a plurality of antenna elements are grouped instead of a single antenna element. For example, as shown in (C) in FIG. 7, three antenna elements are set as one antenna element group. It is desirable to select a combination of antenna elements that is periodic with respect to the traveling direction. As a result, even if the vehicle 20 is displaced in the direction orthogonal to the traveling direction of the vehicle 20 with respect to the geographic coordinates of the electric wave map, the antenna element close to the geographic coordinates of the electric wave map can be used.

The overall arrangement of the antenna elements may be any arrangement of the antenna elements so as to be able to respond to changes in the traveling direction of the vehicle 20, for example, instead of the hexagon as shown in FIG. 7, it may be a triangle, a circle, or an ellipse. Further, the individual arrangement of the antenna elements may be in a lattice shape instead of the honeycomb shape.

1.5.2. Brief

As described above, according to the first modification example of the first embodiment, in addition to the effect of the first embodiment, the optimum antenna element can be selected even when the vehicle 20 turns, and stable communication can be realized.

1.6. Second Modification Example of First Embodiment

In the antenna 200 of the first embodiment, the antenna element are fixed to the vehicle 20. On the other hand, the antenna 220 of this modification example has a configuration in which the antenna element is movable with respect to the vehicle 20.

1.6.1. Configuration of Terminal Apparatus 100

Figure 8:
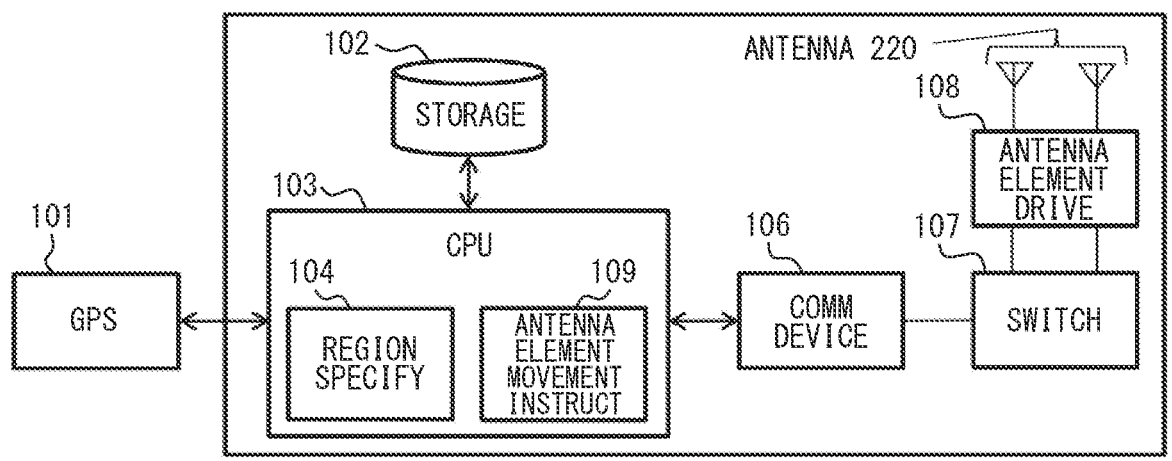
FIG. 8 is a block diagram illustrating a configuration of a terminal apparatus according to a second modification example of the first embodiment.

FIG. 8 shows the terminal apparatus 100 of this example. In this example, in addition to the configuration of the terminal apparatus 100 of the first embodiment shown in FIG. 2, the present embodiment includes an antenna element driver device 108, which may also be referred to as an antenna element driver 108, for moving the antenna element. Further, instead of the antenna element selection unit 105, the antenna element movement instruction unit 109 is provided. Hereinafter, only the portion having a function different from that of the first embodiment will be described.

The antenna element driver device 108 moves a plurality of antenna elements of the antenna 220 along the traveling direction of the vehicle 20. The antenna element driver device 108 may include a moving mechanism using magnetism or a moving mechanism using a pulley.

The antenna element movement instruction unit 109 instructs the antenna element driver device 108 to move the antenna elements so that the antenna element belongs to the region specified by the region specification unit 104. Similar to the antenna element selection unit 105 of the first embodiment, the antenna element movement instruction unit 109 instructs the antenna element driver device 108 to move the antenna element based on the speed information and the position information of the vehicle 20.

Figure 9:
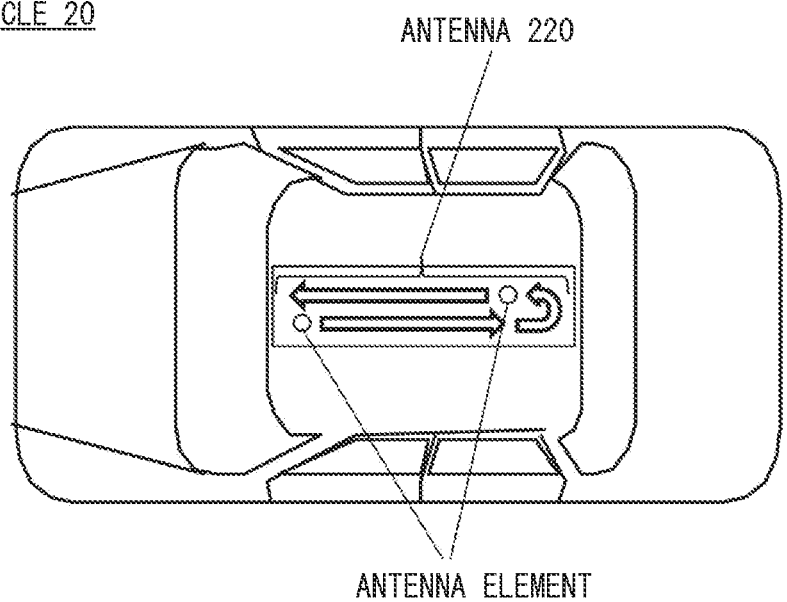
FIG. 9 is a diagram illustrating an antenna included in the terminal apparatus according to the second modification example of the first embodiment.

FIG. 9 is a diagram showing an antenna 220 mounted on the vehicle 20. The antenna element of the antenna 220 can be moved in the direction opposite to the traveling direction of the vehicle 20 by the antenna element driver device 108 so as to follow the region specified by the region specification unit 104 as the vehicle 20 moves. Further, the antenna element that has moved to the rear end side of the vehicle 20 can be forwarded to the front end side of the vehicle 20 in preparation for the next operation.

Only one such movable antenna element may be used. However, if a plurality of antenna elements are provided, it is not necessary to wait until a first one antenna element that has moved to the rear end side of the vehicle 20 returns to the front end side of the vehicle 20. A different second one antenna element that stands by on the front end side of the vehicle 20 can be used. According to such a configuration, the communication is not interrupted during the forwarding of the antenna element, and the stability of the communication can be improved.

When a plurality of antenna elements are provided, the antenna element driver device 108 may be installed for each of the plurality of antenna elements according to the principle of moving each antenna element. Alternatively, only one may be installed for a plurality of antenna elements.

Figure 10:
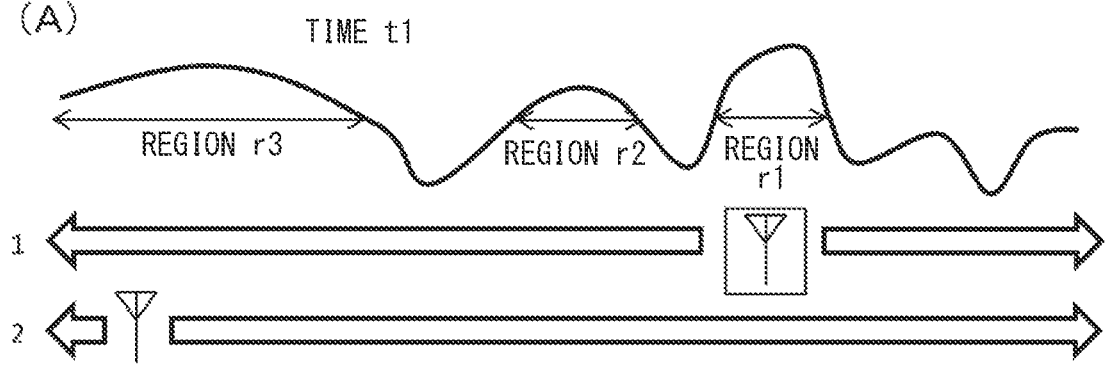
FIG. 10 is a diagram illustrating a region specified by a region specification unit and an antenna element selected by an antenna element selection unit of the terminal apparatus according to the second modification example of the first embodiment.
Figure 10:
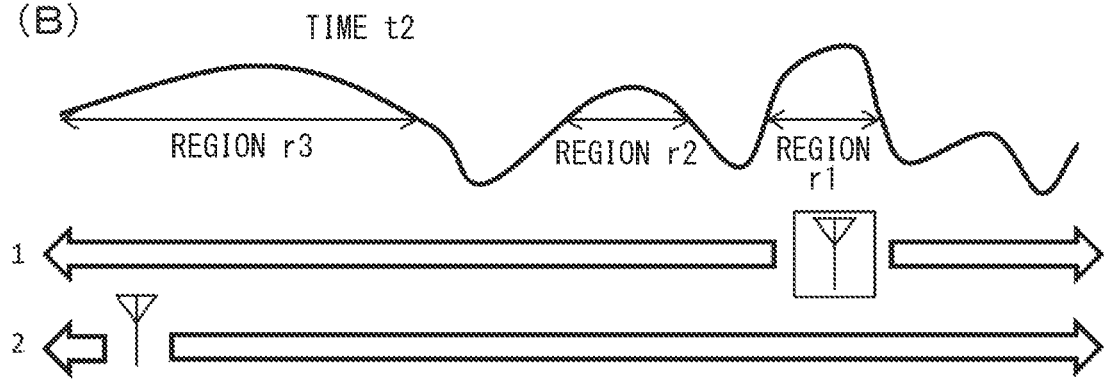
Figure 10:
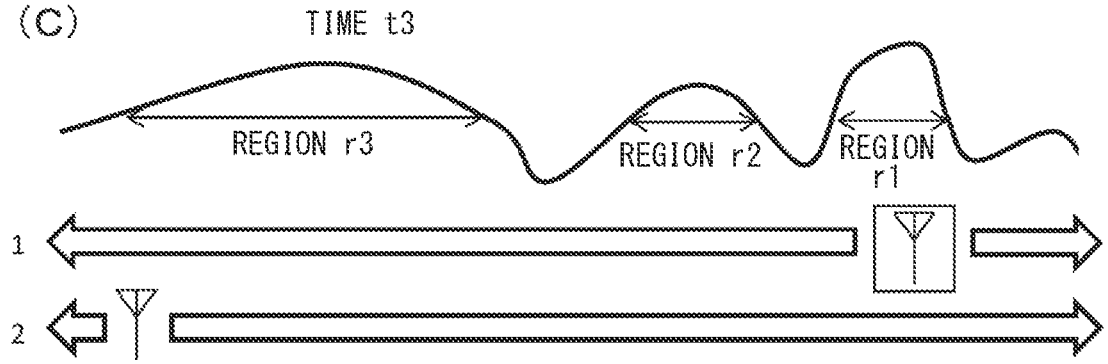
Figure 10:
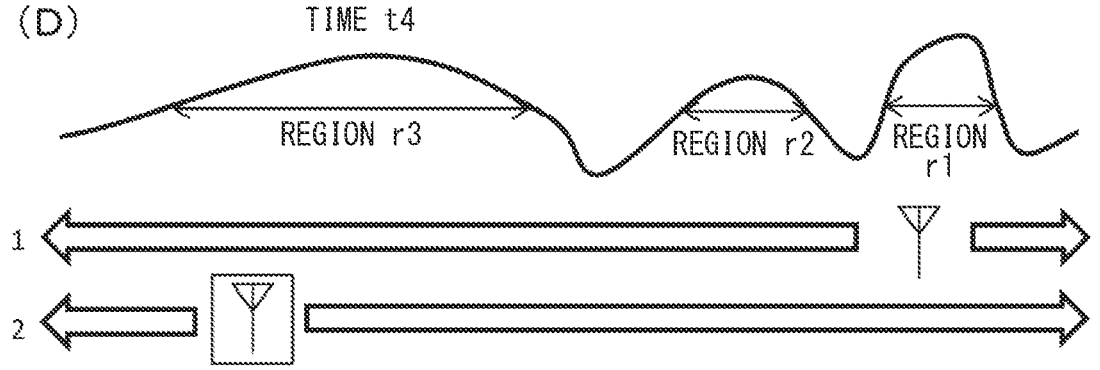

In FIG. 10, (A) to (D) show electric wave maps at times t1 to t4, respectively, as in (A) to (D) in FIG. 5.

As shown in (A) in FIG. 10, at time t1, the antenna element movement instruction unit 109 selects the antenna element 1 close to the region r1.

As shown in (B) in FIG. 10, at time t2, the antenna element movement instruction unit 109 instructs the antenna element driver device 108 to move the antenna element 1 selected at time t1 in the direction opposite to the traveling direction of the vehicle 20 so that the antenna element 1 selected at time t1 belongs to the region r1. The antenna element 1 moves so as to follow the region r1 according to the instruction of the antenna element movement instruction unit 109.

As shown in (C) in FIG. 10, at time t3, the antenna element 1 moves to the rear end side of the vehicle 20.

As shown in (D) in FIG. 10, at time t4, the antenna element movement instruction unit 109 selects the antenna element 2 located on the front end side of the vehicle 20. Then, the antenna element movement instruction unit 109 instructs the antenna element driver device 108 to move the antenna element 2 in the direction opposite to the traveling direction of the vehicle 20 so that the antenna element 2 belongs to the region r3 different from the region r1.

In FIG. 10, the antenna element movement instruction unit 109 instructs the antenna element driver device 108 to move the antenna element so as to follow the region specified by the region specification unit 104. In contrast, when viewed from the stationary coordinate system, it can be said that the antenna element is moved so as to be located at specific stationary coordinates as the vehicle 20 travels. That is, in order that the communicating antenna element is stationary on the stationary coordinates, the antenna element movement instruction unit 109 instruct the antenna element driver device 108 to move the antenna element in the direction opposite to the traveling direction of the vehicle 20 as the vehicle 20 moves. As a result, the region where the communication environment is good can be used for a longer time, so that stable communication can be continued.

1.6.2. Operation of Terminal Apparatus 100

Figure 11:
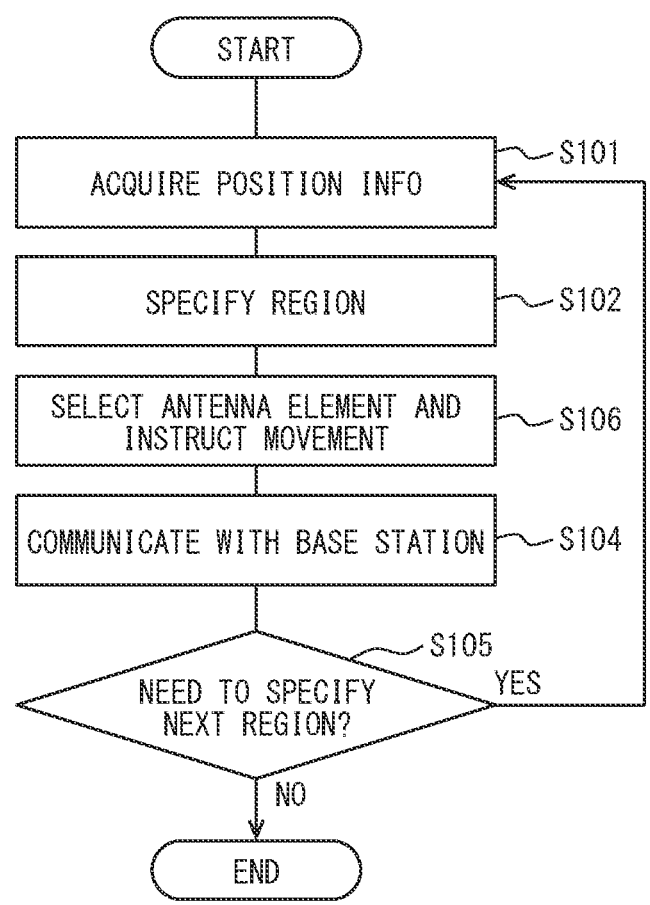
FIG. 11 is a flowchart illustrating an operation of the terminal apparatus according to the second modification example of the first embodiment.

Next, the operation of the terminal apparatus 100 according to the second modification example of the first embodiment will be described with reference to FIG. 11.

The operation of the terminal apparatus 100 of the present example has S106 instead of S103 with respect to the operation of the terminal apparatus 100 of the first embodiment of FIG. 6. Since the other steps are the same as those in FIG. 6, only S106, which is different from FIG. 6, will be described.

In step S106, the antenna element movement instruction unit 109 selects an antenna element close to the region specified by the region specification unit 104 from the plurality of antenna elements, and instructs the antenna element driver device 108 to move the antenna element so that the selected antenna element belongs to the region specified by the region specification unit 104.

1.6.3. Brief

As described above, according to the second modification example of the first embodiment, since the selected antenna element can be moved, the communication can be continued without performing the handover between the antenna elements. Further, since the antenna characteristics are constant at any position of the movable range of the antenna element, communication can be performed using the entire movable range of the antenna element.

2. SECOND EMBODIMENT

A second embodiment is in which a electric wave map including propagation environment information is acquired by the terminal apparatus 100 itself.

2.1. Configuration of Terminal Apparatus 100

Figure 12:
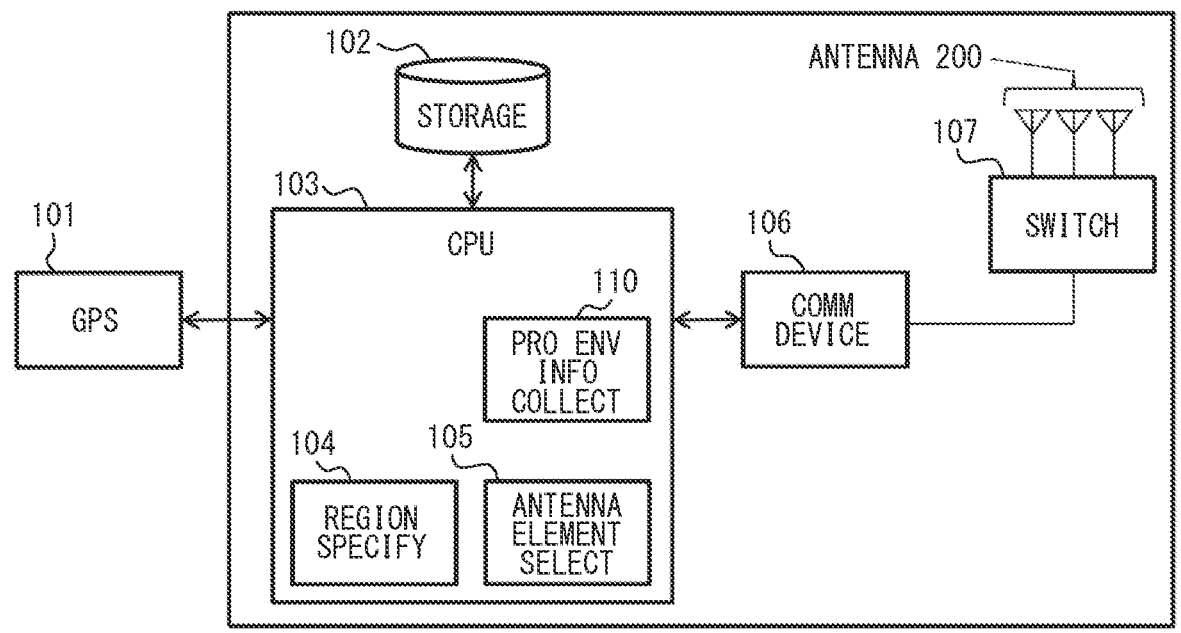
FIG. 12 is a block diagram illustrating a configuration of a terminal apparatus according to a second embodiment.

The configuration of the terminal apparatus 100 of the present embodiment is shown in FIG. 12. The terminal apparatus 100 of the present embodiment includes a propagation environment information collection unit 110 in addition to the configuration of FIG. 2 showing the first embodiment. Further, the antenna 200 includes a reference antenna element 230. Hereinafter, the description of the part having the same function as that of FIG. 2 is omitted, and the explanation of FIG. 2 is quoted.

Figure 13:
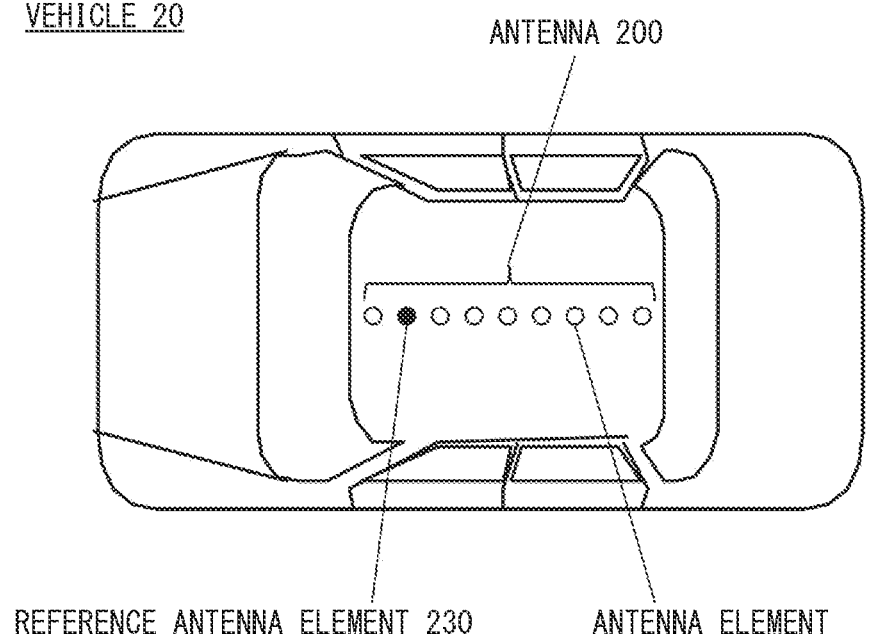
FIG. 13 is a diagram illustrating an antenna included in the terminal apparatus according to the second embodiment.

FIG. 13 is a diagram showing an antenna 200 mounted on the vehicle 20 and a reference antenna element 230 included in the antenna 200. As shown in FIG. 13, in the antenna 200, a plurality of antenna elements are periodically arranged on the upper surface of the vehicle 20 from the front to the rear of the vehicle 20, that is, along the traveling direction of the vehicle 20. Further, the antenna 200 includes at least one reference antenna element 230 on the front side in the traveling direction of the vehicle 20. The reference antenna element is an antenna element for receiving a reference signal or transmitting/receiving a reference signal. The reference antenna element may also have the function of a normal antenna element.

Suppose the antenna element spacing between the neighboring antenna elements is about the wavelength or less. In such a case, among the antenna elements, the antenna elements at both ends of the vehicle 20 in the traveling direction are not suitable as a reference antenna element because the influence of the adjacent elements is different from that of the other antenna elements. On the other hand, since it is desirable that the reference antenna element 230 is designated as the second antenna element from the front. That is, an antenna element having the same characteristics as the intermediate antenna element is used as the reference antenna element 230. As a result, the electric wave map required for selecting the antenna element by the antenna element selection unit 105 can be acquired with a margin in time.

The antenna 200 may include two or more reference antenna elements 230. This makes it possible to correct variations in characteristics between antenna elements. Furthermore, it is possible to detect changes in the propagation environment information at the same position. For example, more stable communication can be performed by giving priority to communication in a region where there is little change in propagation environment information at the same point.

The propagation environment information collection unit 110 acquires the propagation environment information estimated based on the measurement result of the reference signal received by the reference antenna element 230. Then, the acquired propagation environment information is stored in the storage device 102. In the present embodiment, the reception intensity estimated based on the measurement result when the reference signal transmitted from the base station 500 is received by the reference antenna element 230 is acquired and stored in the storage device 102. In the present embodiment, for each frequency of the reference signal, a electric wave map is stored which shows a correlation between (i) the position information indicating the position where the reference signal is received and (ii) the reception intensity estimated based on the measurement result of the reference signal at the position indicated by the position information.

The region specification unit 104 acquires the propagation environment information, that is, the reception intensity estimated based on the measurement result of the reference signal from the storage device 102, and specifies a region defined by the reception intensity and used for communication by the antenna 200. In the present embodiment, the reception intensity obtained from the storage device 102 is used to specify a region where the reception intensity is equal to or higher than a predetermined threshold value.

The antenna element selection unit 105 selects the antenna element based on the position information of the vehicle 20 or the speed information of the vehicle 20 acquired by the GPS 101.

Here, the speed information may directly or indirectly indicate the speed of the movable body. The speed information includes, for example, acceleration, a moving distance per fixed time, and a required time per fixed distance, in addition to the speed. It also includes the output of a speed pulse that generates a signal such as a pulse each time the vehicle travels a certain distance.

The antenna element selection unit 105 selects the antenna element in the same manner as in the first embodiment. That is, the antenna element selection unit 105 specifies the position of the vehicle 20 on the electric wave map based on the position information of the vehicle 20 acquired by the GPS 101, and also specifies the position of each antenna element on the electric wave map. Then, the antenna element selection unit 105 selects an antenna element belonging to the region specified by the region specification unit 104.

In the present embodiment, since the position of the reference antenna element 230 and the distance to another antenna element are known, it is not always necessary to use the position information. That is, if the speed information of the vehicle 20 is known, the second embodiment can obtain (i) the position to which the region detected by the reference antenna element 230 and specified by the region specification unit 104 has transitioned at the current time, and (ii) the antenna element belonging to the specified region. In other words, the position of the vehicle 20 on the electric wave map can be specified without going through the stationary coordinates obtained by the GPS 101. Further, since it is not necessary to use the stationary coordinates obtained by the GPS 101, the electric wave map of the present embodiment does not necessarily need to correlate with the position information. For example, it suffices if the correlation between the reception time and the reception intensity is included.

The electric wave map of the present embodiment and the electric wave map of the first embodiment may be used in combination. According to this configuration, even if the electric wave map cannot be acquired by the host vehicle for some reason, the control can be complemented by using the electric wave map acquired by another vehicle.

2.2. Brief

As described above, according to the second embodiment, since the electric wave map acquired in real time while the vehicle 20 is traveling can be used, the accuracy of the electric wave map can be further improved. Further, since it is not always necessary to use the position information, the time required for selecting the antenna element can be shortened, and the power consumption by the GPS 101 can be reduced.

2.3. First Modification Example of Second Embodiment

In the present embodiment, the propagation environment information is collected in real time by itself. However, it takes a predetermined time from the time when the reference antenna element 230 receives the reference signal to the time when the antenna element to be used is selected. That is, first, the propagation environment information collection unit 110 calculates the reception intensity estimated based on the measurement result of the reference signal received by the reference antenna element 230. Second, the region specification unit 104 then specifies the region used for communication by the antenna 200. Third, the antenna element selection unit 105 then selects an antenna element belonging to the region. In a duration from first to third, there will be a delay time due to the performance of the software and hardware included in the terminal apparatus 100. On the other hand, the measurement result by the propagation environment collection unit 110 is transmitted to the communication partner node, and the communication partner node can perform communication reflecting the measurement result. In such a duration, there will be a delay time due to the software and hardware included in the communication partner node and the time required for communication to transmit the propagation environment information. In this modification example, the antenna element is selected in consideration of the delay time until communication reflecting the propagation environment information becomes possible in both the terminal apparatus and the partner node apparatus.

Figure 14:
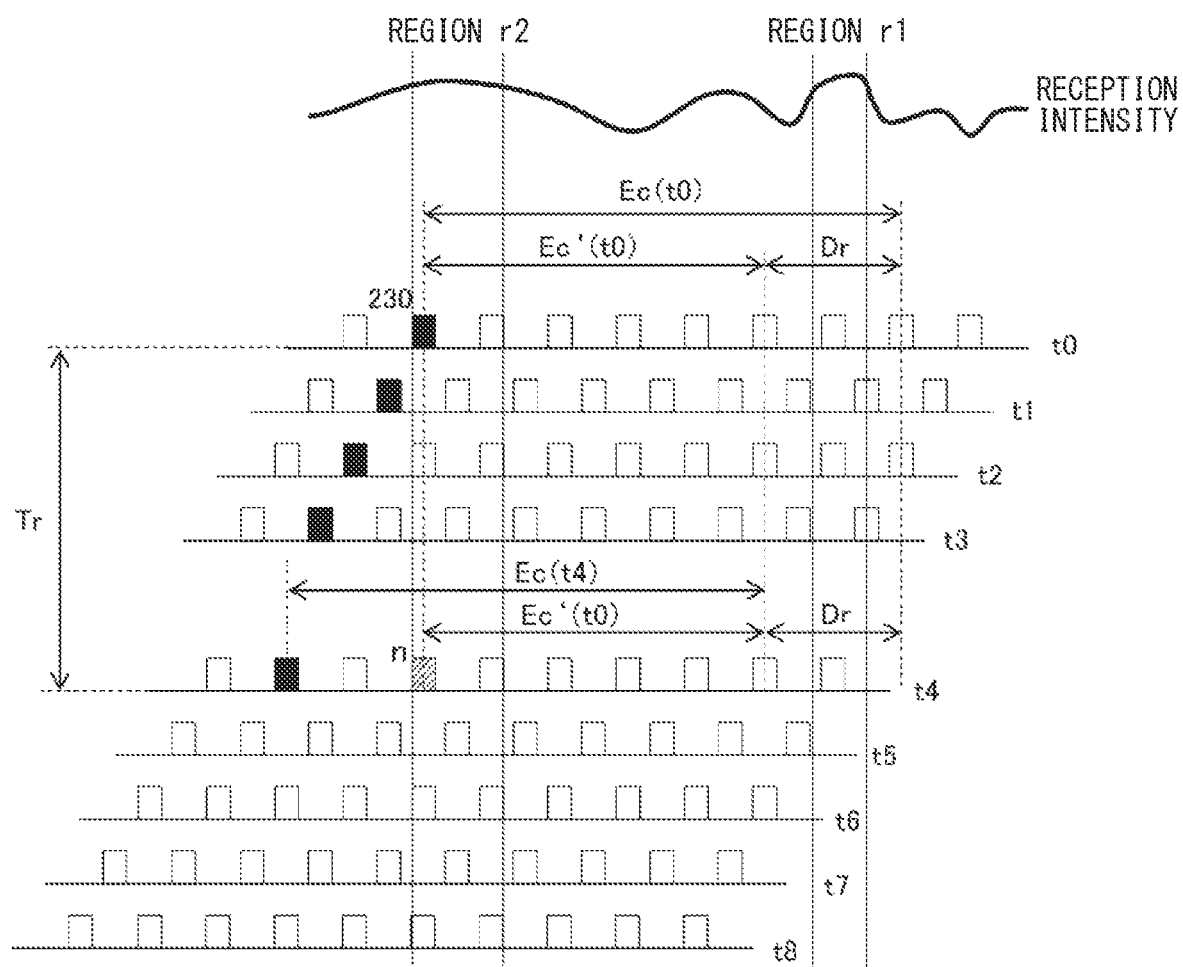
FIG. 14 is a diagram illustrating an antenna element selected by an antenna element selection unit included in the terminal apparatus according to a first modification example of the second embodiment.

FIG. 14 shows how the antenna element in FIG. 13 mounted on the vehicle 20 moves as the vehicle 20 moves. As the vehicle 20 moves, the reference antenna element 230 also moves. The reception intensity estimated based on the measurement result of the reference signal received by the reference antenna element 230 at time t0 can be used at the time when Tr has elapsed from t0, where Tr is the above-mentioned delay time. For example, in FIG. 14, the reception intensity of the reference antenna element 230 at the stationary coordinate position at time t0 can be reflected in the communication after time t4. In this way, the reception intensity estimated at the position of the reference antenna element 230 will be sequentially determined at the time delayed by the delay time Tr as the vehicle 20 moves.

The range of the antenna elements excluding the front antenna element and the rearmost antenna element with respect to the traveling direction of the vehicle 20 is defined as Ec. The characteristics of the front antenna element and the rearmost antenna element are different from those of the other antenna elements because the adjacent antenna element of each of the front antenna element and the rearmost antenna element is only on one side. That is, since the antenna elements in the Ec range have the same characteristics, it is desirable to select the antenna elements in this range. This applies not only to the present embodiment and the present modification example, but also to all other embodiments.

If the delay time Tr is not taken into consideration, the antenna element selection unit 105 can select the antenna elements from the range of Ec (t0) at time t0. However, when the delay time Tr is taken into consideration, the vehicle 20 traveling at the speed x during the delay time Tr travels a distance of Tr×x=Dr. That is, the antenna elements in the range of Dr from the rear end of Ec cannot be selected because it is out of the range of Ec (t4) at time t4 after the delay time Tr. Therefore, the antenna element selection unit 105 selects the antenna elements included in Ec' (t0), which is a region specified by the region specification unit 104 at time t4 and excluding the range of Dr in the latter part of Ec (t0).

According to the example of FIG. 14, the antenna element selection unit 105 selects the antenna element n belonging to the region r2 included in Ec' (t0) among the regions r1 and region r2 specified by the region specification unit 104 at time t4.

As described above, according to this modification example, the antenna element can be switched without interrupting the communication by considering the delay time Tr.

In addition, this modification example can be also applied to all embodiments other than the present embodiment.

2.4. Second Modification Example of Second Embodiment

It is optional whether the first embodiment and the present embodiment consider the variation of the propagation environment of the electric wave propagation path in the region specified by the region specification unit 104. A second modification example of the present embodiment performs processing in consideration of changes in the electric wave environment in the region.

Figure 15:
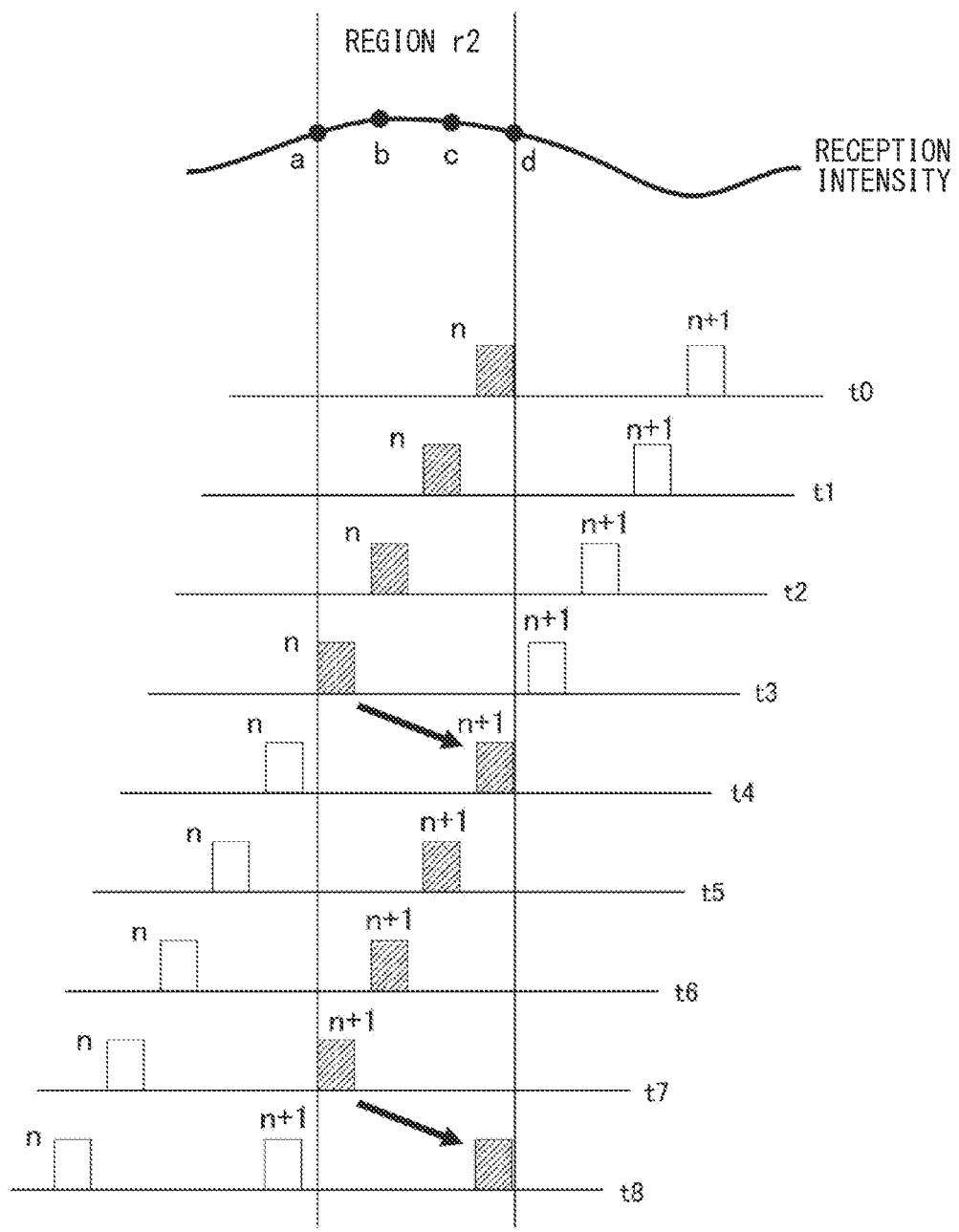
FIG. 15 is a diagram illustrating control of an antenna element selection unit and a communicator device included in the terminal apparatus according to a second modification example of the second embodiment.

FIG. 15 shows how the antenna elements of FIG. 13 mounted on the vehicle 20 move as the vehicle 20 moves, as in FIG. 14. In FIG. 15, the reception intensity of the region r2 specified by the region specification unit 104 is not constant within the region r2. That is, in FIG. 15, the reception intensity estimated based on the measurement result of the reference signal shows the values of d, c, b, and a toward the traveling direction of the vehicle 20. Hereinafter, such a varying reception intensity value is referred to as a variation value.

At time t0, the antenna element selection unit 105 selects the antenna element n belonging to the region r2 specified by the region specification unit 104. Then, at the antenna element n at the time t0, t1, t2, and t3, the variation value is changed to d, c, b, and a. Therefore, processing is performed based on such variation in the propagation path state.

For example, on the transmitting side, the modulation method of the transmitted signal is adaptively changed. For example, when the terminal apparatus 100 is a transmitting side apparatus, the communicator device 106 of the terminal apparatus 100 changes the modulation method of the signal transmitted by the communicator device 106. When the base station 500 is a transmitting side apparatus, the communicator device of the base station 500 changes the modulation method of the signal transmitted by the base station 500. In this case, the terminal apparatus 100 estimates the reception intensity based on the estimation result of the propagation path state, that is, the measurement result of the reference signal received by the reference antenna element 230 of the terminal apparatus 100 in the present embodiment. The estimated reception intensity may be transmitted to the base station 500 in advance.

At time t4, the antenna element n deviates from the region r2 as the vehicle 20 moves. Therefore, the antenna element selection unit 105 switches the antenna element used for communication from the antenna element n to the antenna element n+1. Then, at the antenna element n+1 at the time t4, t5, t6, and t7, it is expected that the variation value changes to d, c, b, and a as in the case of the antenna element n.

Therefore, every time the antenna element is switched, the variation value in the region specified by the region specification unit 104 is repeatedly used.

Note that the processing based on the variation of the propagation path state is not limited to changing the modulation method. For example, as a transmission process on the transmission side, the communicator device 106 or the like may adaptively change the coding rate or the redundancy of the signal to be transmitted. Further, the communicator device 106 and the like may adaptively change the data rate of the information transmitted by the transmitted signal by compression or the like. Alternatively, when MIMO is used, the communicator device 106 or the like may adaptively change the weight of each antenna element as the reception process on the receiving side.

Such processing is particularly effective when the antenna element spacing between the neighboring antenna elements is not sufficiently smaller than the fading pitch.

As described above, according to this modification example, it is possible to prevent the loss of data to be transmitted/received by performing the processing in consideration of the variation of the propagation environment of the electric wave propagation path. In addition, this modification example can be applied to all embodiments other than the present embodiment.

3. THIRD EMBODIMENT

A third embodiment is an embodiment in which at least one of the transmitting side and the receiving side communicates using a plurality of antenna elements. An example, in which at least one of the transmitting side and the receiving side uses a plurality of antenna elements, includes SIMO (Single-Input Multiple-Output), MISO (Multiple-Input Single-Output), MIMO (Multiple-Input Multiple-Output), and spatial region index modulation (also referred to as spatial modulation). The present embodiment will describe on the premise that MIMO is used.

3.1. Configuration of Terminal Apparatus 100

Figure 2:
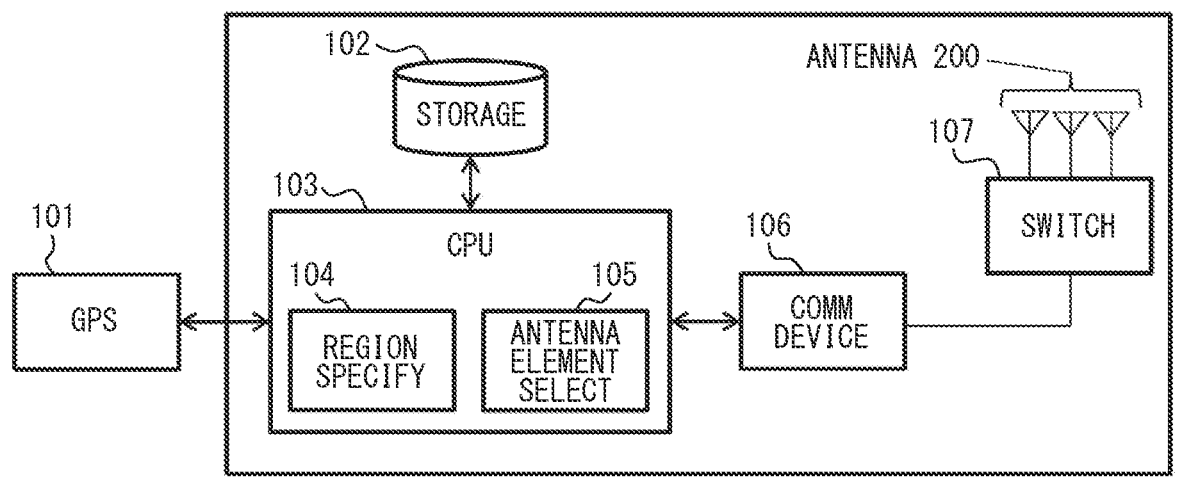
FIG. 2 is a block diagram illustrating a configuration of a terminal apparatus according to the first embodiment.

The configuration of the terminal apparatus 100 of the present embodiment is the same as that of FIG. 2 except for the functions of the region specification unit 104 and the antenna element selection unit 105. Hereinafter, the description of the part having the same function as that of FIG. 2 is omitted, and the explanation of FIG. 2 is quoted.

The region specification unit 104 acquires the reception intensity of the signal transmitted from the base station 500 and obtains a combination of a plurality of regions for which the transmission performance including the spatial multiplexing effect is optimized. Specifically, for each combination of candidate regions, a transmission performance index can be calculated by a known MIMO calculation, and the results can be compared to obtain the optimum combination of regions.

The antenna element selection unit 105 selects two or more antenna elements belonging to the region specified by the region specification unit 104. That is, two or more antenna elements used for communication by the communicator device 106 using MIMO or the like are selected. Then, the antenna element selection unit 105 performs a handover of the antenna elements so as to follow the region specified by the region specification unit 104 as the vehicle 20 moves.

Figure 16:
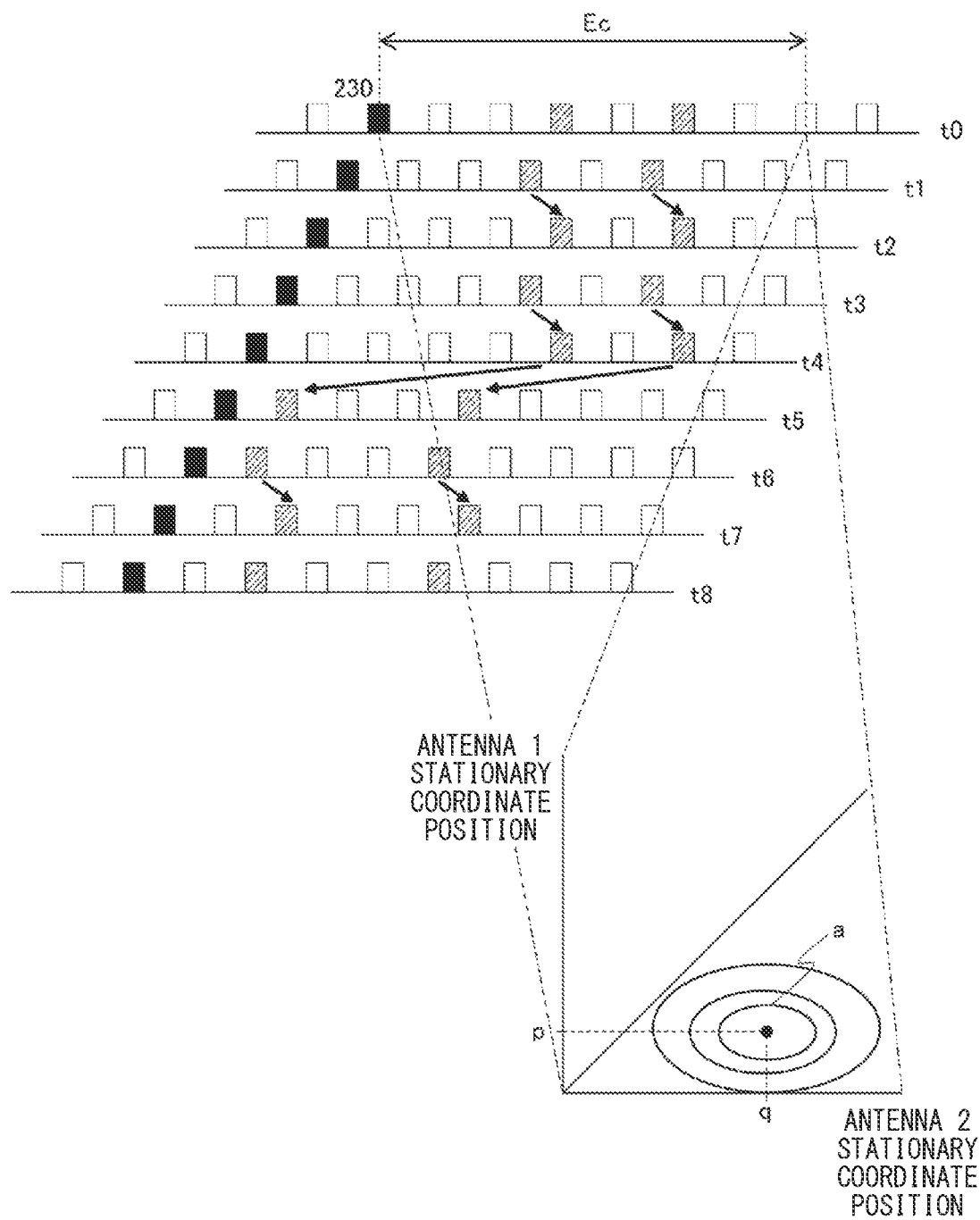
FIG. 16 is a diagram illustrating a region specified by a region specification unit and an antenna element selected by an antenna element selection unit included in a terminal apparatus according to a third embodiment.

FIG. 16 is a diagram showing a specific method for selecting a plurality of antenna elements from the antenna elements mounted on the vehicle 20. As shown in the first modification example of the second embodiment, the range of the antenna elements used for transmission/reception is defined as Ec.

At time t0, the region specification unit 104 obtains the propagation path estimation result up to time t0 using the reference antenna element 230. The region specification unit 104 calculates the weight by which each transmitting/receiving antenna element is multiplied with respect to all combinations of the antenna element 1 and the antenna element 2 which are two antenna elements to be selected from the antenna elements in the range of Ec. The calculation for obtaining the weight is performed by an optimization calculation that maximizes the target transmission performance (for example, channel capacitance, SINR, difference in received signal between transmission element selection results when using spatial modulation, etc.). Then, the combination that maximizes this optimization result is obtained. In FIG. 16, the result of the optimization calculation is shown by a heat map. The heat map shows the transmission capacity that can be achieved when the weights are optimized. The region specification unit 104 obtains the region a which is the region having the largest achievable capacity. In addition, information regarding the weight by which the antenna element of the partner node is multiplied is separately transmitted to the partner node. The information regarding the weight by which the antenna element of the partner node is multiplied may be a selection result from a codebook which is a candidate of a predetermined precoding weight matrix, or the like, in addition to the weight itself.

Then, the antenna element selection unit 105 selects the antenna element closest to the center coordinates (p, q) of the region a as the antenna element 1 and the antenna element 2. Since the region a is the propagation path estimation result in the stationary coordinates, the antenna element selection unit 105 selects and switches the antenna element as follows so that the vehicle 20 follows the region a as the vehicle moves.

At time t1, the antenna elements that belonged to the region a at time t0 have not yet deviated from the region a, so that the antenna element selection unit 105 does not switch the antenna element 1 and the antenna element 2.

As a result of the vehicle 20 advancing, at the time t2, the antenna elements belonging to the region a at the time t1 exit from the region a. Therefore, the antenna element selection unit 105 switches each of the antenna element 1 and the antenna element 2 to an adjacent antenna element.

At time t4, the antenna element 2 is switched to the rearmost antenna element among the antenna elements in the Ec range. Therefore, at the time t5, the region specification unit 104 performs the same calculation as at the time t0 from the propagation path estimation result up to the time t4 using the reference antenna element 230, and obtains a new region a. Then, the antenna element selection unit 105 selects the antenna elements closest to the center coordinates of the new region a at time t5 as the antenna element 1 and the antenna element 2.

In the above example, the region specification unit 104 performs the optimization calculation when the rearmost antenna element among the selectable antenna elements is selected. However, instead of this, the optimization calculation may be performed every time. In the above example, the antenna element selection unit 105 selects the antenna elements in the range of Ec. However, instead of this, the antenna elements belonging to a range (Ec') excluding the range of Dr from the rear end of Ec may be selected as in the first modification example of the second embodiment. In the above example, a plurality of antenna elements are selected as the receiving antenna. However, a plurality of antenna elements may be selected as the transmitting antenna. That is, the optimization calculation may be performed on either the transmitting side or the receiving side. Further, the calculation result may be notified to the apparatus of the other party of communication. In the above example, the weight by which the region specification unit 104 multiplies the antenna element is calculated. However, the antenna element selection unit 105 may perform this calculation. The above example is an example in which two antenna elements are selected, but three or more antenna elements may be selected. A group of antenna elements may be used to optimize only the weight, which will be described in the next modification example.

3.2. Brief

As described above, according to the third embodiment, in the communication using a plurality of antenna elements, the communication quality and the communication speed can be improved, and stable communication can be continued.

3.3. First Modification Example of Third Embodiment

The third embodiment selects a plurality of antenna elements belonging to the region obtained by the optimization calculation. In this modification example, communication is performed by using a group of antenna elements to determine the weight by which each antenna element is multiplied.

Figure 17:
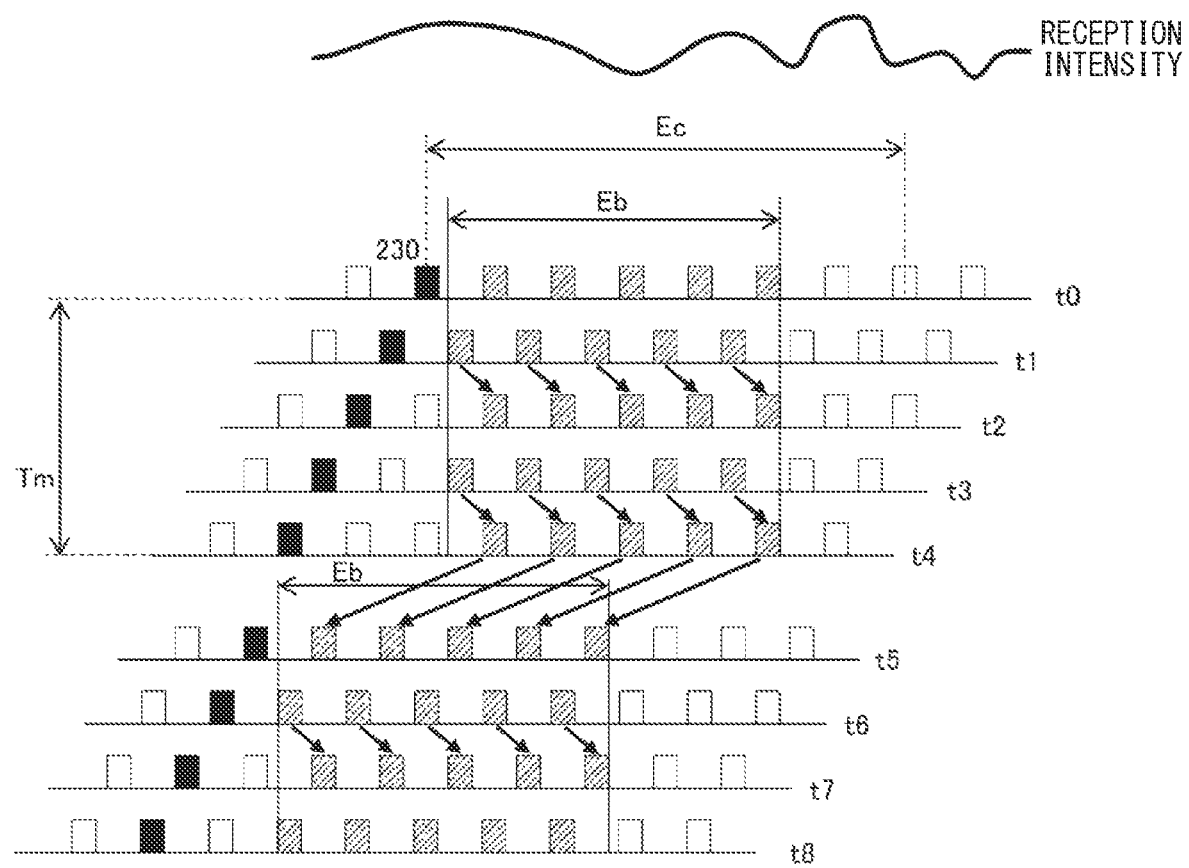
FIG. 17 is a diagram illustrating a region specified by a region specification unit and an antenna element selected by the antenna element selection unit included in the terminal apparatus according to a first modification example of the third embodiment.

FIG. 17 is a diagram showing an example which uses a group of antenna elements from among the antenna elements mounted on the vehicle 20. As shown in the third embodiment and the first modification example of the second embodiment, the range of the antenna elements used for transmission/reception is defined as Ec.

At time t0, the region specification unit 104 obtains the propagation path estimation result up to time t0 using the reference antenna element 230.

The antenna element selection unit 105 calculates the weights of all the antenna elements in the range of Eb and all the antenna elements used by the partner node for communication with the terminal apparatus 100 according to the propagation path estimation result. Eb is a stationary coordinate range of a group of antenna elements among the antenna elements included in the range of Ec excluding the reference antenna element 230. Eb indicates the length of the stationary coordinate system that can be provided by the antenna elements included in the range of Ec during the period of Tm even if the vehicle 20 moves. When the speed of the vehicle 20 is constant, if Tm is short, Eb can be long, so that more antenna elements can be used. Further, if Tm is long, Eb cannot be taken long, but the repetitions of setting the range of Eb and the repetitions of calculating the weights become small. Although Tm or Eb may be set to a constant value, it may be variable according to the speed of the vehicle 20.

The weights are calculated by the antenna element selection unit 105 based on the propagation path estimation result such that the target transmission performance is determined to be maximum. The target transmission performance includes channel capacitance, SINR, difference in received signal between transmission element selection results when using spatial modulation. Then, the antenna element selection unit 105 instructs the communicator device 106 to multiply the signals transmitted and received from the respective antenna elements in the range of Eb by the calculated weights. The communicator device 106 multiplies the transmitted/received signals by the weights and outputs the signals to the respective antenna elements.

At time t1, the antenna element selection unit 105 instructs the communicator device 106 to multiply the signals transmitted and received from the respective antenna elements in the range of Eb by the weights calculated at time t0. At time t1, the antenna elements in the range of Eb are the same as that at time t0.

At time t2, the antenna element selection unit 105 instructs the communicator device 106 to multiply the signals transmitted and received from the respective antenna elements in the range of Eb by the weights calculated at time t0. At time t2, as the vehicle 20 travels, the antenna elements in the range of Eb are different from that at time t1. Therefore, the antenna element selection unit 105 switches the antenna elements selected at time t1 by selecting the antenna elements adjacent to the antenna elements selected at time t1. The antenna element selection unit 105 then instructs the communicator device 106 to multiply the signals transmitted and received from the respective antenna elements in the range of Eb by the weights obtained at time t0 for the antenna elements after switching.

At time t4, the rearmost antenna element in the Eb range is the rearmost antenna element in the Ec range. Therefore, at the time t5, the region specification unit 104 obtains the propagation path estimation result up to the time t4 using the reference antenna element 230. The antenna element selection unit 105 calculates the weights of all the antenna elements in the new Eb range according to the propagation path estimation result. Then, the antenna element selection unit 105 instructs the communicator device 106 to multiply the signals transmitted and received from the respective antenna elements in the new Eb range by the obtained weights.

In the present modification example, the region specification unit 104 obtains the propagation path estimation result. However, microscopically, it obtains the propagation path estimation result in the region in which the stationary coordinate range of Eb is divided at equal intervals. Therefore, it is synonymous with obtaining the region defined by the propagation environment information described in the first to third embodiments.

Further, in the present embodiment, the antenna element selection unit 105 calculates the weight of each antenna element according to the propagation path estimation result, and instructs the communicator device 106 to multiply the signal for transmitting and receiving by the obtained weight. Therefore, microscopically, the utilization of the antenna elements is determined by calculating the weights corresponding to the region in which the stationary coordinate range of Eb is divided into equal intervals. That is, it is synonymous with selecting an antenna element at the decimal level or the complex number level.

In the above example, Eb indicates the length of the stationary coordinate system that can be provided by the antenna elements included in the range of Ec during the period of Tm even if the vehicle 20 moves. However, instead of this, as in the first modification example of the second embodiment, Eb may be the length of the stationary coordinates provided by the antenna elements belonging to the antenna included in the range (Ec') excluding the range of Dr from the rear end of Ec during the period of Tm.

As described above, according to the present modification example, since a group of a wide range of antenna elements can be used, communication can be made more stable.

4. FOURTH EMBODIMENT

The present embodiment is an embodiment in which a plurality of antenna elements are used to perform communication in a plurality of different wireless communication methods.

4.1. Outline of Communication System

First, the outline of the communication system 1002 of the present embodiment will be described with reference to FIG. 18.

Figure 18:
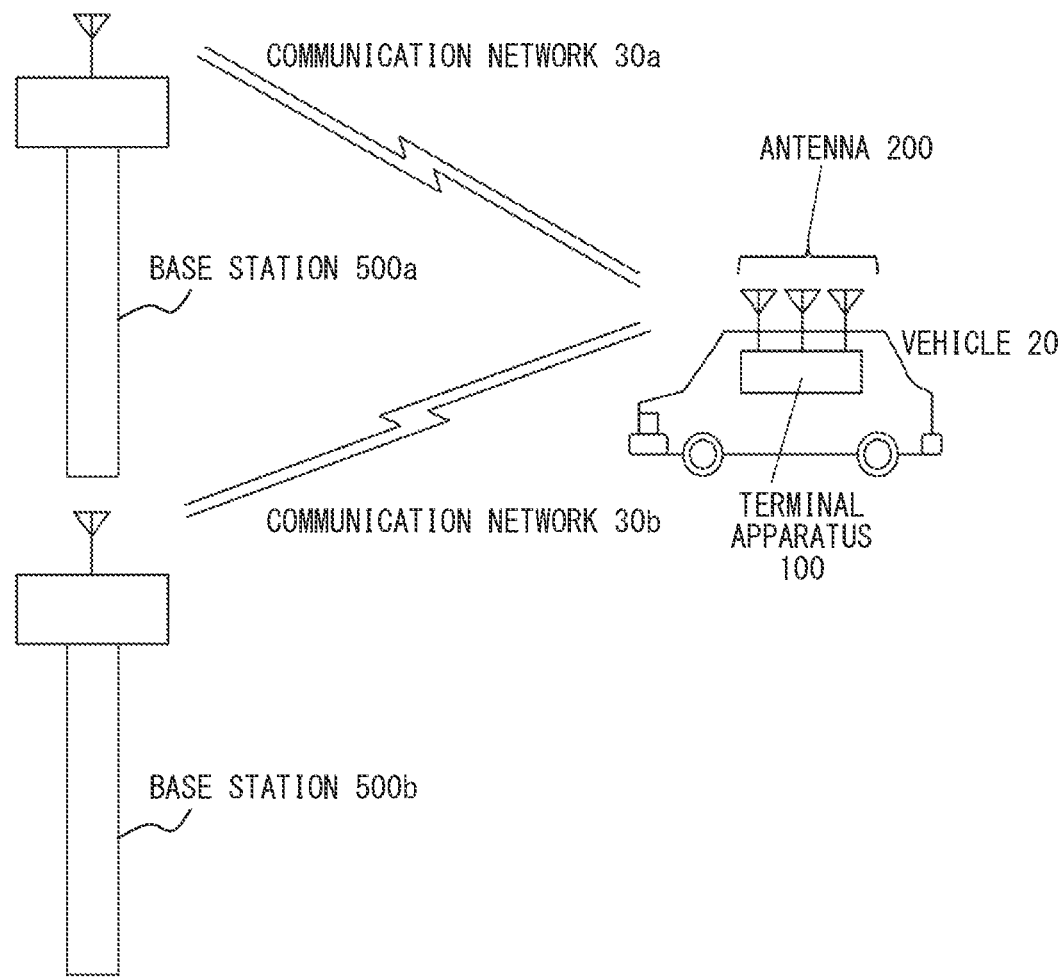
FIG. 18 is a diagram illustrating an outline of a communication system including a terminal apparatus according to a fourth embodiment.

The communication system 1002 shown in FIG. 18 uses a plurality of different wireless communication methods. The communication system 1002 includes a first base station 500a (corresponding to a first communication apparatus), a second base station 500b (corresponding to a second communication apparatus), and a terminal apparatus 100 mounted on the vehicle 20. The terminal apparatus 100 includes an antenna 200 composed of a plurality of antenna elements.

The configuration with the same reference sign as in FIG. 1 is the same as in FIG. 1. Further, the base station 500a and the base station 500b each have the same configuration as the base station 500. Further, the communication networks 30a and 30b are any of the wireless communication methods described in the communication network 30, respectively. For example, the communication network 30a can be WiFi and the communication network 30b can be 4G.

4.2. Configuration of Terminal Apparatus 100

Figure 19:
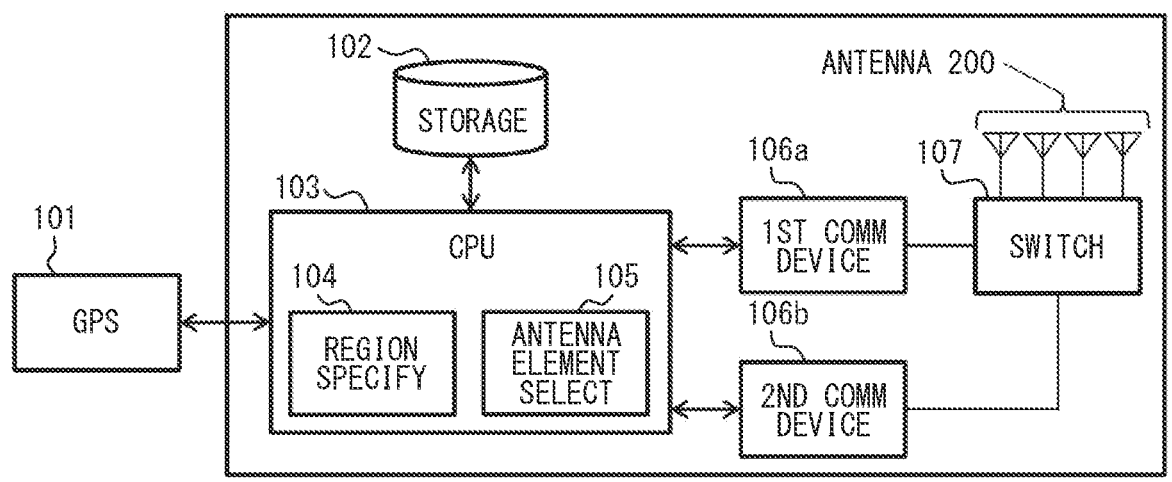
FIG. 19 is a block diagram illustrating a configuration of the terminal apparatus according to the fourth embodiment.

FIG. 19 shows the terminal apparatus 100 of the present embodiment. In the present embodiment, the terminal apparatus 100 includes two communicator devices of a first communicator device 106a and a second communicator device 106b, instead of the communicator device 106 in the terminal apparatus 100 according to the first embodiment in FIG. 2. Hereinafter, only the portion having a function different from that of the first embodiment will be described.

The storage device 102 stores the propagation environment information of the electric wave propagation path with each of the first base station 500a and the second base station 500b. In the present embodiment, the respective electric wave maps are saved.

The region specification unit 104 acquires the propagation environment information with each of the first base station 500a and the second base station 500b, and specifies regions defined by the respective propagation environment information and used for communication by the antenna 200. In the present embodiment, the electric wave map held in the storage device 102 is used to specify a region where the signal reception intensity in each wireless communication method is equal to or higher than a predetermined threshold value.

The antenna element selection unit 105 selects two antenna elements (corresponding to a first antenna element and a second antenna element) belonging to each region specified by the region specification unit 104.

The first communicator device 106a communicates with the first base station 500a using a first antenna element, and the second communicator device 106b communicates with the second base station 500b using a second antenna element.

An example of selecting or switching of the antenna element by the antenna element selection unit 105 will be described with reference to (A) to (D) in FIG. 20. Here, (A) to (D) in FIG. 20 use the same rules as in (A) to (D) in FIG. 5. Note that the solid line corresponds to the electric wave map of the electric wave used in the communication network 30a, and the broken line corresponds to the electric wave map of the electric wave used in the communication network 30b.

Figure 20:
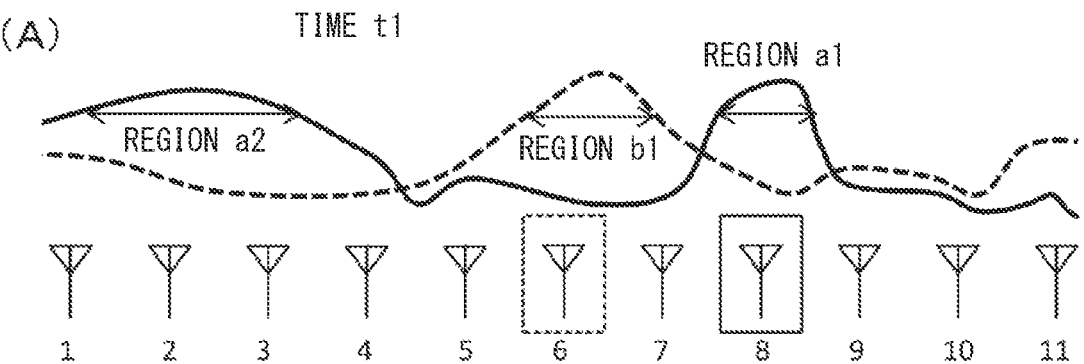
FIG. 20 is a diagram illustrating a region specified by a region specification unit and an antenna element selected by an antenna element selection unit included in the terminal apparatus according to the fourth embodiment.
Figure 20:
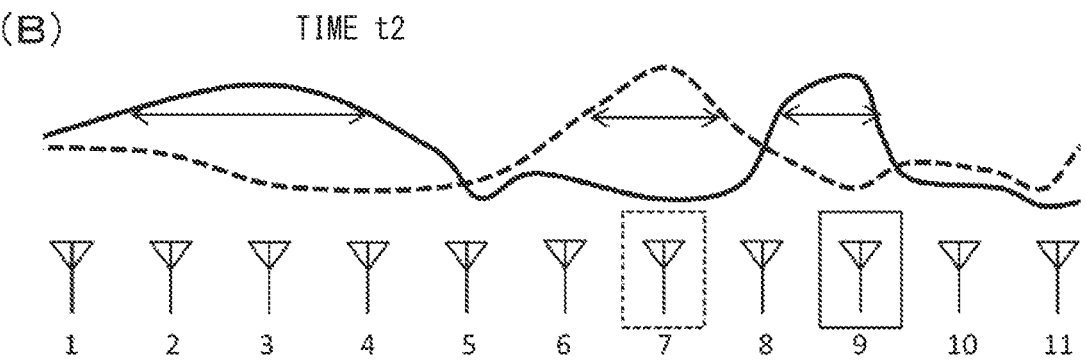
Figure 20:
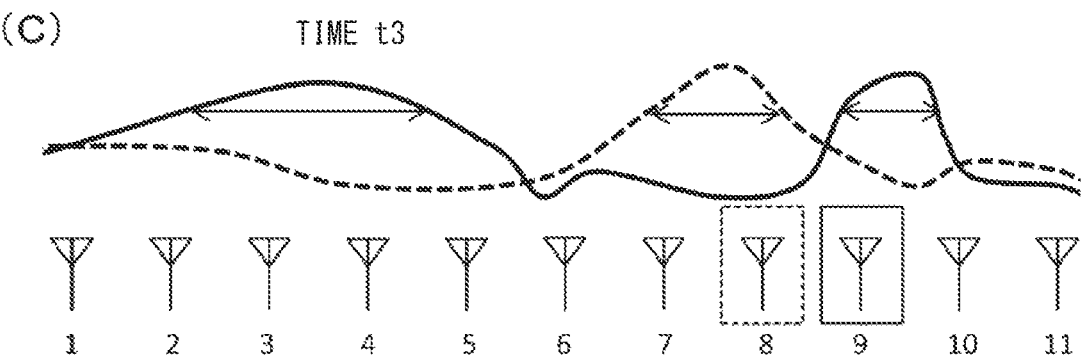
Figure 20:
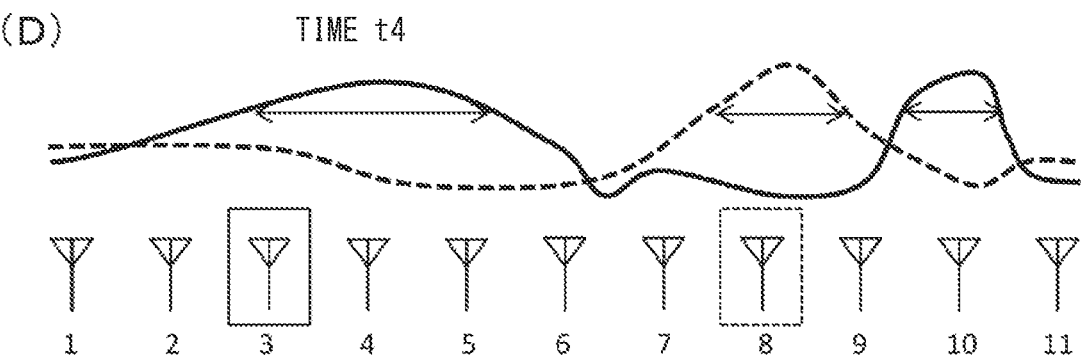

As shown in (A) in FIG. 20, at time t1, the antenna element selection unit 105 selects the antenna element 8 belonging to the region a1. Further, the antenna element selection unit 105 selects the antenna element 6 belonging to the region b1.

As shown in (B) in FIG. 20, at time t2, the region a1 and the region b1 have transitioned to the rear side in the traveling direction, so that the antenna element selection unit 105 selects the antenna element 9 belonging to the region a1 and the antenna element 7 belonging to the region b1.

As shown in (C) in FIG. 20, at time t3, the region a1 and the region b1 have transitioned to the rear side in the traveling direction. Since the antenna element 9 still belongs to the region a1, the antenna element 9 is continuously selected. On the other hand, since the antenna element 7 is about to deviate from the region b1, the antenna element selection unit 105 selects the antenna element 8 belonging to the region b1.

As shown in (D) in FIG. 20, at time t4, the region a1 has further transitioned to the rear side in the traveling direction. In this case, the antenna element 10 may be selected. However, since the time when the region a1 shifts to the rear of the vehicle 20 is approaching, the antenna element 3 belonging to the region a2 on the front side in the traveling direction is selected. That is, the antenna element 9 is switched to the antenna element 3. On the other hand, since the antenna element 8 still belongs to the region b1, the antenna element 8 is continuously selected.

4.3. Brief

As described above, according to the fourth embodiment, it is possible to realize communication in which the influence of spatial selectivity fading is reduced in each of a plurality of different wireless communication methods.

5. FIFTH EMBODIMENT

The first to fourth embodiments are communication systems assuming communication between a base station and a terminal apparatus. In contrast, the present embodiment will describe a communication system assuming so-called vehicle-to-vehicle communication.

5.1. Communication System 1003

First, the outline of the communication system 1003 of the present embodiment will be described with reference to FIG. 21.

Figure 21:
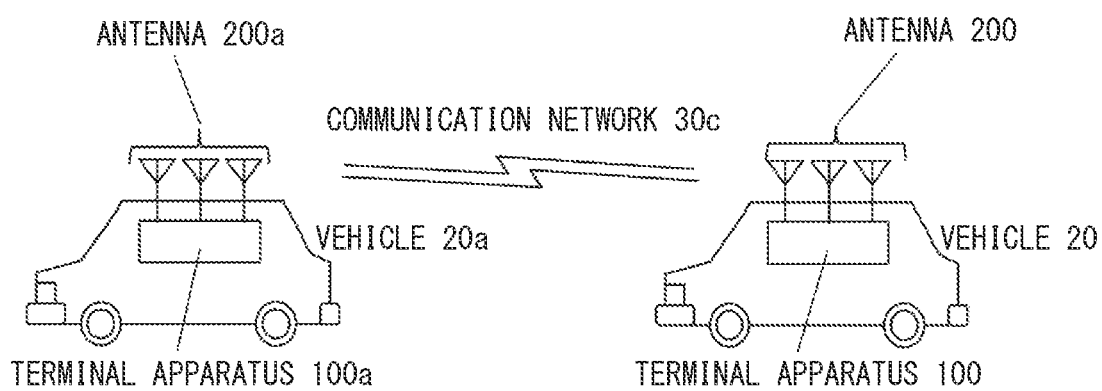
FIG. 21 is a diagram illustrating an outline of a communication system including a terminal apparatus according to a fifth embodiment.

The communication system 1003 shown in FIG. 21 is a communication system that assumes so-called vehicle-to-vehicle communication. The communication system 1003 includes a terminal apparatus 100 mounted on the vehicle 20 and a terminal apparatus 100a (corresponding to "a different terminal apparatus) mounted on the vehicle 20a (corresponding to a different movable body). The terminal apparatus 100 includes an antenna 200 composed of a plurality of antenna elements, and the terminal apparatus 100a includes an antenna 200a composed of a plurality of antenna elements.

The terminal apparatus 100, which is mounted on the vehicle 20, communicates with the terminal apparatus 100a mounted on the vehicle 20a via the communication network 30c to transmit and receive necessary information.

5.2. Configuration of Terminal Apparatus 100

The configuration of the terminal apparatus 100 of the present embodiment is the same as the configuration of FIG. 2 except for the function of the region specification unit 104. Further, the present embodiment uses the same electric wave map as that described in the second embodiment. Hereinafter, the description of the part having the same function as that of FIG. 2 is omitted, and the explanation of FIG. 2 is quoted.

The region specification unit 104 acquires the reception intensity estimated based on the measurement result of the reference signal transmitted from the terminal apparatus 100a, and obtains the region where the transmission performance is optimized. In the present embodiment, a region having optimum efficiency in the communication between the terminal apparatuses 100 and 100a, which are paring in transmission and reception, is specified from a combination of a plurality of antenna elements of the terminal apparatus 100 and a plurality of antenna elements of the terminal apparatus 100a. Therefore, in the present embodiment, the optimum region is specified for each of the transmitting terminal apparatus and the receiving terminal apparatus, and the handover of the antenna elements is performed so that both terminal apparatuses follow the respective specified regions.

Figure 22:
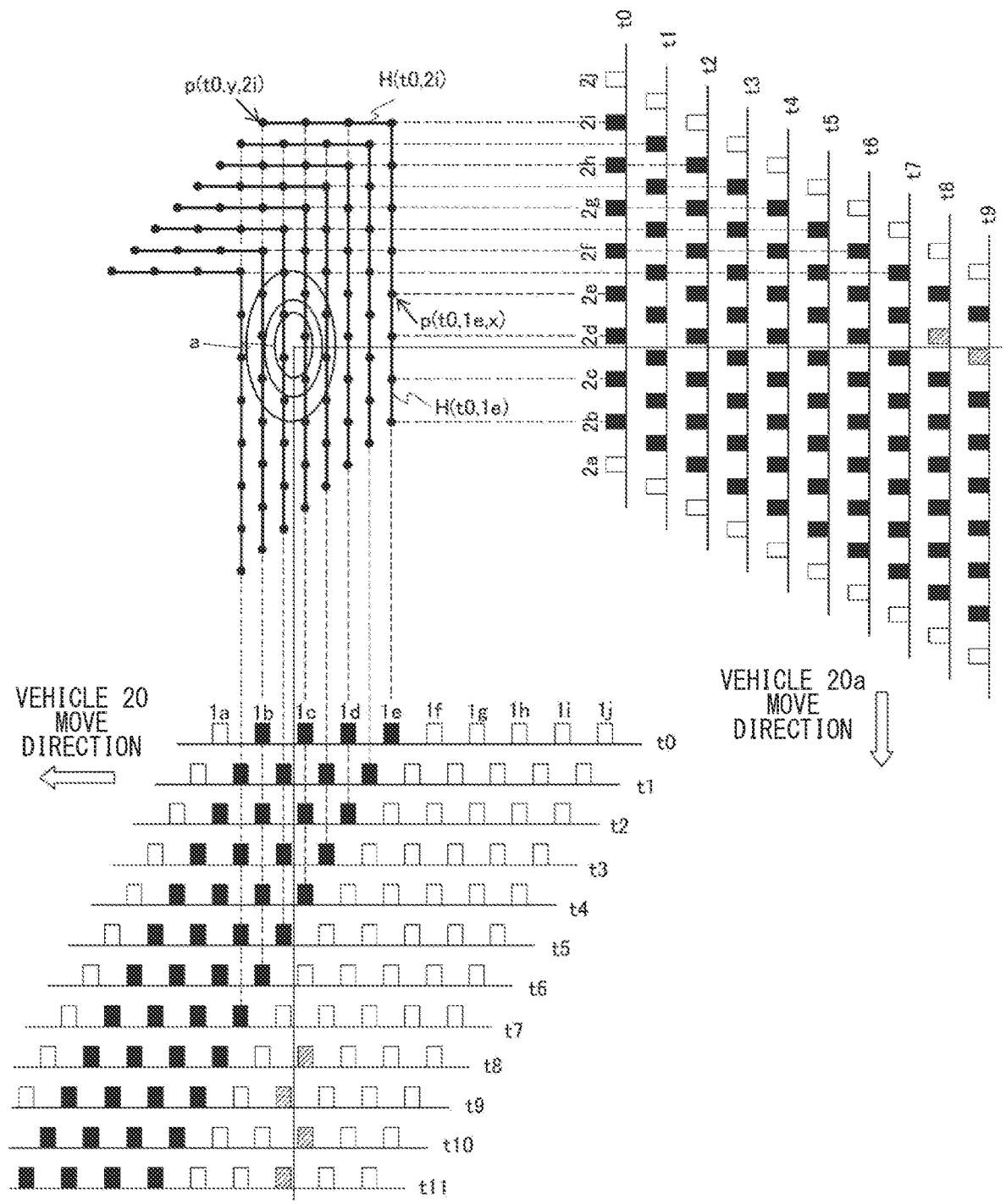
FIG. 22 is a diagram illustrating a region specified by a region specification unit and an antenna element selected by an antenna element selection unit included in the terminal apparatus according to the fifth embodiment.

The details of the operation of the terminal apparatus 100 of the present embodiment will be described with reference to FIG. 22. The vehicle 20 includes ten antenna elements 1a to 1j as the antenna 200. Of these, the antenna elements 1b, 1c, 1d, and 1e are reference antenna elements. The antenna element 1e is a reference antenna element for transmitting and receiving a reference signal. The other antenna elements 1b, 1c, and 1d are reference antenna elements for receiving the reference signal. The vehicle 20a includes ten antenna elements from the antenna elements 2a to 2j as the antenna 200a. Of these, the antenna elements 2b, 2c, 2d, 2e, 2f, 2g, 2h, and 2i are reference antenna elements. The antenna element 2i is a reference antenna element for transmitting and receiving a reference signal. The other antenna elements 2b, 2c, 2d, 2e, 2f, 2g, and 2h are reference antenna elements for receiving the reference signal.

At time t0, the terminal apparatus 100 of the vehicle 20 transmits a reference signal of the wireless frame f1 to the terminal apparatus 100a of the vehicle 20a from the antenna element 1e. The terminal apparatus 100a receives the signals from the reference antenna elements 2b to 2i, respectively. As a result, the terminal apparatus 100a acquires the propagation path measurement result, that is, the estimated reception intensity group H (t0, 1e) including eight points of the reception intensity p (t0, 1e, 2b) to p (t0, 1e, 2i) of the reference signal.

Immediately after the transmission of the wireless frame f1 is completed, the terminal apparatus 100a of the vehicle 20a transmits the reference signal of the wireless frame f2 to the terminal apparatus 100 of the vehicle 20 from the antenna element 2i. The terminal apparatus 100 receives the signal from the reference antenna elements 1b to 1e. As a result, the terminal apparatus 100 acquires the propagation path measurement result, that is, the estimated reception intensity group H (t0, 2i) including four points of the reception intensity p (t0, 1b, 2i) to p (t0, 1e, 2i) of the reference signal.

The terminal apparatus 100 and the terminal apparatus 100a share each other's propagation path measurement results by transmitting the respective propagation path measurement results to the other party's apparatus.

Similarly, after the time t1, the terminal apparatus 100 and the terminal apparatus 100a alternately transmit the reference signal, and the other party apparatus receives the reference signal and acquires the propagation path measurement result. Then, each other's propagation path measurement results are shared.

In this way, based on the heat map which is the propagation path estimation result acquired within a predetermined period, for example, between t1 and t7, the region specification unit 104 of each terminal apparatus obtains a region a, which is a region having high transmission efficiency in the heat map. Then, the antenna element selection unit 105 of each terminal apparatus obtains an antenna element belonging to the region a. According to FIG. 22, the terminal apparatus 100 selects the antenna element 1g at the time t8, and the terminal apparatus 100a selects the antenna element 2h at the time t8. Since this heat map is a propagation path estimation result in stationary coordinates, the antenna element belonging to the region a is selected by using this heat map even after the vehicle 20 and the vehicle 20a have moved.

5.3. Brief

As described above, according to the fifth embodiment, it is possible to realize communication in which the influence of spatial selectivity fading is reduced in vehicle-to-vehicle communication.

6. ASPECTS

According to aspects of the first to fifth embodiments, the following is provided.

A terminal apparatus (100) mounted on a movable body (20) is provided to communicate with an external communication apparatus (500) outside the movable body. The terminal apparatus includes an antenna (200), a region specification unit (104), an antenna element selection unit (105), and a communicator device (106). The antenna (200) includes a plurality of antenna elements to be arranged along a traveling direction of the movable body. The region specification unit (104) is configured to acquire propagation environment information of an electric wave propagation path of a signal transmitted to and received from the external communication apparatus, and specify a region defined by the propagation environment information and used for communication using the antenna. The antenna element selection unit (105) is configured to select, as a communicating antenna element, at least one antenna element of the plurality of antenna elements belonging to the region specified by the region specification unit. The communicator device (106) is configured to communicate with the external communication apparatus using the communicating antenna element that is the at least one antenna element selected by the antenna element selection unit.

Further, the first to fifth embodiments are characterized in that the antenna element to be used is switched so as to be stationary at the stationary coordinates. Therefore, it can be grasped as an embodiment of the following configuration.

A terminal apparatus (100) mounted on a movable body (20) is provided to communicate with an external communication apparatus (500) outside the movable body. The terminal apparatus includes an antenna (200), an antenna element selection unit (105), and a communicator device (106). The antenna (200) includes a plurality of antenna elements to be arranged along a traveling direction of the movable body. The antenna element selection unit (105) is configured to select at least one communicating antenna element of the plurality of antenna elements so as to switch the selected at least one communicating antenna element in order from the antenna element on the front side in the traveling direction of the movable body toward the antenna element on the rear side in the traveling direction of the movable body as the movable body moves to enable the selected at least one communicating antenna element to be maintained stationary on stationary coordinates. The communicator device (106) is configured to communicate with the external communication apparatus using the antenna element selected by the antenna element selection unit.

Here, "being maintained stationary" means that the antenna element communicating is within a certain range of the stationary coordinates when viewed from the stationary coordinates.

In particular, in the first modification example of the third embodiment, the region specified in the range of Eb is not the region defined by the propagation environment information when viewed macroscopically, and the Eb may be set to have a predetermined length set in advance. Further, in this case, the antenna element selection unit 105 is sufficient to select antenna elements within the range of Eb from a macroscopic point of view. That is, Eb is a stationary coordinate range, and a group of antenna elements is selected so as to sequentially switch the group of antenna elements in this range.

In addition to the terminal apparatus, the present disclosure may be applied to the communication method having the same characteristics and the communication program having the same characteristics.

7. OVERVIEW

The features of the terminal apparatus according to each embodiment of the present disclosure and the communication method executed by the terminal apparatus have been described above.

Terms used in the description of each embodiment are examples and may be replaced with synonymous terms or terms having a synonymous function.

The block diagram used in the description of each embodiment is a diagram in which the configurations of terminal apparatuses and the like are classified and organized by function. These functional blocks may be provided by any combination of hardware or software. Further, since the functions are shown, the block diagram can be understood as disclosure of the method and the program that implements the method.

Order of functional blocks that can be grasped as processing, a sequence, and a method described in relation to each embodiment may be changed unless some restriction is imposed, for example, a result from one step is utilized at another step.

The terms of "first" and "second" used in the description of each embodiment and claims are for discriminating two or more configurations and methods of the same kind and do not limit order or superiority or inferiority.

The present disclosure is implemented not only by dedicated hardware having a configuration and a function described in relation to each embodiment. The present disclosure can also be implemented as a combination of a program for implementing the present disclosure, stored on such a storage medium as memory and a hard disk and general-purpose hardware including dedicated or general-purpose CPU, memory, or the like, capable of executing the program.

A program may be stored in a non-transitory tangible storage medium including (i) an external storage (e.g., hard disk, USB memory, CD/BD), or (ii) an internal storage (e.g., RAM, ROM) in a special-purpose or general-purpose hardware (e.g., computer). Such a program may be downloaded to the storage medium in the hardware via a communication link from a server. Consequently, when the program is upgraded, the latest function is always provided. A special-purpose or general-purpose hardware storage medium and an internal storage are examples of a computer-readable non-transitory tangible storage medium.

8. INDUSTRIAL APPLICABILITY

Although the movable body of the present disclosure has been described by taking a vehicle as an example, it may be a motorcycle, a bicycle with a motor, a railroad, a ship, an aircraft, or the like.

9. ADDITIONAL DESCRIPTION

For reference to further explain features of the present disclosure, the description is added as follows.

There is a technique where communication is performed between a terminal apparatus mounted on a vehicle and a base station. Such a technique has realized services such as providing information, which is acquired by a sensor mounted on the vehicle, from the vehicle to the base station and providing information necessary for traveling of the vehicle from the base station to the vehicle. Furthermore, there are actively conducted researches or demonstration experiments of vehicle-to-vehicle communication for exchanging information between one vehicle and another vehicle.

Further, there is disclosed a wireless communication system that realizes a large transmission capacity while obtaining a directional gain in communication between a base station apparatus and the terminal apparatus, even when the terminal apparatus moves at high speed. Specifically, a transmission weight vector is calculated in advance based on a plurality of channel information between the base station antenna element and the antenna of the terminal apparatus acquired in advance for each position on the path on which the vehicle moves. This calculated transmission weight vector is stored. The data signal transmitted by the base station to the terminal apparatus is multiplied by the transmission weight vector corresponding to the position of the terminal apparatus.

The present inventor has found the following issues. The above wireless communication system does not support switching the antenna element in the antenna of the terminal apparatus. Thus, when the terminal apparatus moves, it is affected by the spatial selectivity fading caused by the interference of electric waves.

It is thus desired for the present disclosure to provide a terminal apparatus and a communication method for the terminal apparatus, which can reduce the influence of spatial selectivity fading.

Aspects of the present disclosure described herein are set forth in the following clauses.

According to a first aspect of the present disclosure, a terminal apparatus mounted on a movable body is provided to communicate with an external communication apparatus outside the movable body. The terminal apparatus includes an antenna, a region specification unit, an antenna element selection unit, and a communicator device. The antenna includes a plurality of antenna elements to be arranged along a traveling direction of the movable body. The region specification unit is configured to acquire propagation environment information of an electric wave propagation path of a signal transmitted to and received from the external communication apparatus, and specify a region defined by the propagation environment information and used for communication using the antenna. The antenna element selection unit is configured to select, as a communicating antenna element, at least one antenna element of the plurality of antenna elements belonging to the region specified by the region specification unit. The communicator device is configured to communicate with the external communication apparatus using the communicating antenna element that is the at least one antenna element selected by the antenna element selection unit. The terminal apparatus may further include at least one processor coupled to the antenna and the communicator device, and at least one memory coupled to the processor. The memory is configured to store computer-readable instructions configured to, when executed by the processor, cause the processor to implement the region specification unit and the antenna element selection unit.

According to a second aspect of the present disclosure, a computer-implemented communication method is provided to be executed by at least one processor for a terminal apparatus mounted on a movable body to communicate with an external communication apparatus outside the movable body. The method includes: acquiring propagation environment information of an electric wave propagation path of a signal transmitted to and received from the external communication apparatus; specifying a region defined by the propagation environment information and used for communication using the antenna; selecting at least a one antenna element of the plurality of antenna elements belonging to the region specified; and communicating with the external communication apparatus using the antenna element selected.

According to a third aspect of the present disclosure, a non-transitory computer readable storage medium comprising instructions is provided for execution by a computer. The instructions includes: acquiring propagation environment information of an electric wave propagation path of a signal transmitted to and received from the external communication apparatus; specifying a region defined by the propagation environment information and used for communication using the antenna; selecting at least a one antenna element of the plurality of antenna elements belonging to the region specified; and communicating with the external communication apparatus using the antenna element selected.

According to the terminal apparatus and the communication method for the terminal apparatus according to the present disclosure, the influence of spatial selectivity fading can be reduced.

What is claimed is:

1. A terminal apparatus mounted on a movable body to communicate with an external communication apparatus outside the movable body, the terminal apparatus comprising:
   an antenna including a plurality of antenna elements to be arranged along a traveling direction of the movable body;
   a region specification unit configured to
      acquire propagation environment information of an electric wave propagation path of a signal transmitted to and received from the external communication apparatus, and
      specify a region defined by the propagation environment information and used for communication using the antenna;
   an antenna element selection unit configured to select at least a one antenna element of the plurality of antenna elements belonging to the region specified by the region specification unit; and
   a communicator configured to communicate with the external communication apparatus using the one antenna element selected by the antenna element selection unit, wherein
   the antenna element selection unit is further configured to unselect the antenna element on a front end in the traveling direction of the movable body and a rear end in the traveling direction of the movable body among the plurality of antenna elements.

2. The terminal apparatus according to claim 1, wherein:
   the antenna element selection unit is further configured to select the one antenna element so as to switch, in sequence, the antenna element on a front side in the traveling direction of the movable body toward the antenna element on a rear side in the traveling direction of the movable body, along with a movement of the movable body, such that the one antenna element that is communicating is stationary on stationary coordinates.

3. The terminal apparatus according to claim 1, wherein:
   the antenna element selection unit is further configured to select the one antenna element that belongs to a first range included in the region specified by the region specification unit, the first range excluding a second range corresponding to a distance that the movable body moves in a predetermined delay time.

4. The terminal apparatus according to claim 1, wherein:
   the communicator is further configured to adaptively change a transmission process or a reception process based on a variation of the propagation environment information in the region specified by the region specification unit.

5. The terminal apparatus according to claim 1, wherein:
   the antenna element selection unit is configured to select the one antenna element by instructing the communicator to multiply a signal transmitted and received by a predetermined weight.

6. The terminal apparatus according to claim 1, wherein:
   in the antenna, the plurality of antenna elements are arranged in a honeycomb shape.

7. The terminal apparatus according to claim 1, further comprising:
   a storage configured to store the propagation environment information.

8. The terminal apparatus according to claim 1, wherein:
   the antenna includes at least a one reference antenna element on a front side in the traveling direction of the movable body;
   the communicator is further configured to acquire the propagation environment information generated from a signal received by the reference antenna element; and
   the antenna element selection unit is further configured to select the one antenna element based on position information or speed information of the movable body.

9. The terminal apparatus according to claim 1, wherein:
   the antenna element selection unit is further configured to select two or more of the antenna elements used for MIMO (Multiple-Input and Multiple-Output).

10. The terminal apparatus according to claim 1, wherein:
    the external communication apparatus is a base station apparatus.

11. The terminal apparatus according to claim 1, further comprising:
    at least one processor coupled to the antenna and the communicator; and
    at least one memory coupled to the processor, the memory being configured to store computer-readable instructions configured to, when executed by the processor, cause the processor to implement the region specification unit and the antenna element selection unit.

12. A terminal apparatus mounted on a movable body to communicate with an external communication apparatus outside the movable body, the terminal apparatus comprising:
    an antenna including a plurality of antenna elements to be arranged along a traveling direction of the movable body;
    a region specification unit configured to
       acquire propagation environment information of an electric wave propagation path of a signal transmitted to and received from the external communication apparatus, and
       specify a region defined by the propagation environment information and used for communication using the antenna;
    an antenna element selection unit configured to select at least a one antenna element of the plurality of antenna elements belonging to the region specified by the region specification unit; and
    a communicator configured to communicate with the external communication apparatus using the one antenna element selected by the antenna element selection unit, wherein
    the communicator is further configured to acquire the propagation environment information previously generated by a different movable body from the different movable body or the propagation environment information previously generated by a base station apparatus from the base station apparatus and the antenna element selection unit is further configured to select the one antenna element based on position information or speed information of the movable body.

13. A terminal apparatus mounted on a movable body to communicate with an external communication apparatus outside the movable body, the terminal apparatus comprising:

an antenna including a plurality of antenna elements to be arranged along a traveling direction of the movable body;

a region specification unit configured to
acquire propagation environment information of an electric wave propagation path of a signal transmitted to and received from the external communication apparatus, and
specify a region defined by the propagation environment information and used for communication using the antenna;

an antenna element selection unit configured to select at least a one antenna element of the plurality of antenna elements belonging to the region specified by the region specification unit; and a communicator configured to communicate with the external communication apparatus using the one antenna element selected by the antenna element selection unit, wherein:

the external communication apparatus includes a first external communication apparatus and a second external communication apparatus;

the communicator includes a first communicator and a second communicator;

the region specification unit is further configured to
acquire (i) first propagation environment information of the electric wave propagation path of a first signal transmitted to and received from the first external communication apparatus and (ii) second propagation environment information of the electric wave propagation path of a second signal transmitted to and received from the second external communication apparatus, and
specify (i) a first region defined by the first propagation environment information and used for communication using the antenna and (ii) a second region defined by the second propagation environment information and used for communication using the antenna;

the antenna element selection unit is further configured to select a first antenna element belonging to the first region specified by the region specification unit and a second antenna element belonging to the second region specified by the region specification unit; and the first communicator is configured to
communicate with the first external communication apparatus using the first antenna element, and
communicate with the second external communication apparatus using the second antenna element.

14. A terminal apparatus mounted on a movable body to communicate with an external communication apparatus outside the movable body, the terminal apparatus comprising:

an antenna including a plurality of antenna elements to be arranged along a traveling direction of the movable body;

a region specification unit configured to
acquire propagation environment information of an electric wave propagation path of a signal transmitted to and received from the external communication apparatus, and
specify a region defined by the propagation environment information and used for communication using the antenna;

an antenna element selection unit configured to select at least a one antenna element of the plurality of antenna elements belonging to the region specified by the region specification unit; and a communicator configured to communicate with the external communication apparatus using the one antenna element selected by the antenna element selection unit, wherein the external communication apparatus is a different terminal apparatus mounted on a different movable body.

15. A computer-implemented communication method executed by at least one processor for a terminal apparatus mounted on a movable body to communicate with an external communication apparatus outside the movable body, the method comprising:
acquiring propagation environment information of an electric wave propagation path of a signal transmitted to and received from the external communication apparatus;
specifying a region defined by the propagation environment information and used for communication using an antenna;
selecting at least a one antenna element of a plurality of antenna elements belonging to the region specified;
communicating with the external communication apparatus using the antenna element selected; and
unselecting the antenna element on a front end in a traveling direction of the movable body and a rear end in the traveling direction of the movable body among the plurality of antenna elements.

16. A non-transitory computer readable storage medium comprising instructions for execution by a computer, the instructions including the computer-implemented communication method according to claim 15.

17. A computer-implemented communication method executed by at least one processor for a terminal apparatus mounted on a movable body to communicate with an external communication apparatus outside the movable body, the method comprising:
acquiring propagation environment information of an electric wave propagation path of a signal transmitted to and received from the external communication apparatus;
specifying a region defined by the propagation environment information and used for communication using an antenna;
selecting at least a one antenna element of a plurality of antenna elements belonging to the region specified;
communicating with the external communication apparatus using the antenna element selected;
acquiring the propagation environment information previously generated by a different movable body from the different movable body or the propagation environment information previously generated by a base station apparatus from the base station apparatus; and selecting the one antenna element based on position information or speed information of the movable body.

\* \* \* \* \*